United States Patent
Raders et al.

(10) Patent No.: US 12,460,160 B2
(45) Date of Patent: Nov. 4, 2025

(54) REDEPOSITION INHIBITING STYRENE MALEIC ANHYDRIDE COPOLYMERS AND DETERGENT COMPOSITIONS CONTAINING SAME

(71) Applicant: Lubrizol Advanced Materials, Inc., Cleveland, OH (US)

(72) Inventors: Steven M. Raders, Macedonia, OH (US); Yunpeng Zhu, Fair Lawn, NJ (US); Nima Hakim, Salford (GB); Janean Nagorski, Akron, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 737 days.

(21) Appl. No.: 17/777,781

(22) PCT Filed: Nov. 19, 2020

(86) PCT No.: PCT/US2020/061176
§ 371 (c)(1),
(2) Date: May 18, 2022

(87) PCT Pub. No.: WO2021/102080
PCT Pub. Date: May 27, 2021

(65) Prior Publication Data
US 2023/0017803 A1    Jan. 19, 2023

Related U.S. Application Data

(60) Provisional application No. 62/937,471, filed on Nov. 19, 2019.

(51) Int. Cl.
| | | |
|---|---|---|
| C11D 1/44 | (2006.01) | |
| C11D 3/00 | (2006.01) | |
| C11D 3/20 | (2006.01) | |
| C11D 3/37 | (2006.01) | |

(52) U.S. Cl.
CPC .......... C11D 3/3757 (2013.01); C11D 3/0036 (2013.01); C11D 3/2013 (2013.01); C11D 3/3707 (2013.01)

(58) Field of Classification Search
CPC .. C11D 3/0036; C11D 3/3757; C11D 2111/12
See application file for complete search history.

(56) References Cited

U.S. PATENT DOCUMENTS

| | | | |
|---|---|---|---|
| 2,379,942 A | 7/1945 | Webber | |
| 2,503,280 A | 4/1950 | Will | |
| 2,507,088 A | 5/1950 | Harri | |
| 2,954,347 A | 9/1960 | St et al. | |
| 3,260,741 A | 7/1966 | John et al. | |
| 3,308,067 A | 3/1967 | Louvaine | |
| 3,372,188 A | 3/1968 | Alston et al. | |
| 3,426,011 A | 2/1969 | Parmerter et al. | |
| 3,453,257 A | 7/1969 | Parmerter et al. | |
| 3,453,259 A | 7/1969 | Parmerter et al. | |
| 3,453,260 A | 7/1969 | Parmerter et al. | |
| 3,459,731 A | 8/1969 | Gramera et al. | |
| 3,543,258 A | 11/1970 | Kaufman | |
| 3,553,191 A | 1/1971 | Parmerter et al. | |
| 3,565,887 A | 2/1971 | Parmerter et al. | |
| 3,606,990 A | 9/1971 | Gobert et al. | |
| 3,933,672 A | 1/1976 | Bartolotta et al. | |
| 4,497,718 A | 2/1985 | Neiditch et al. | |
| 4,535,152 A | 8/1985 | Szejtli et al. | |
| 4,616,008 A | 10/1986 | Hirai et al. | |
| 4,638,058 A | 1/1987 | Brandt et al. | |
| 4,678,598 A | 7/1987 | Ogino et al. | |
| 4,746,734 A | 5/1988 | Tsuchiyama et al. | |
| 5,312,954 A | 5/1994 | Breuer et al. | |
| 5,389,279 A | 2/1995 | Au et al. | |
| 5,942,217 A | 8/1999 | Woo et al. | |
| 6,642,200 B1 | 11/2003 | Zhang et al. | |
| 6,878,695 B2 | 4/2005 | Woo et al. | |
| 7,741,264 B2 | 6/2010 | Smith et al. | |
| 8,293,697 B2 | 10/2012 | Boutique et al. | |
| 8,333,822 B2 | 12/2012 | Lin et al. | |
| 8,357,649 B2 | 1/2013 | Chieffi et al. | |
| 8,785,171 B2 | 7/2014 | Souter et al. | |
| 2009/0030139 A1* | 1/2009 | Roy ..................... | C09D 17/00 524/535 |

(Continued)

FOREIGN PATENT DOCUMENTS

| | | |
|---|---|---|
| EP | 0164514 | 12/1985 |
| EP | 945473 | * 9/1999 |
| GB | 1429143 | 3/1976 |
| GB | 1470250 | 4/1977 |
| JP | 58217598 | 12/1983 |
| WO | 13533 | 11/1990 |
| WO | 56849 | 9/2000 |
| WO | 2014143773 | 9/2014 |
| WO | 184571 | 11/2014 |
| WO | 138872 | 9/2015 |

OTHER PUBLICATIONS

"SMA Resins", Cray Valley from Total; Oct. 15, 2020, pp. 1-7, XP002802139, retrieved from the Internet: URL: https://web.archive.org/web/20191015111022/http://www.chemrep.com/images/pdf/Cray-Valley-Products.pdf.

*Primary Examiner* — Charles I Boyer
(74) *Attorney, Agent, or Firm* — Michael A. Miller

(57) ABSTRACT

The disclosed technology relates to compositions useful as detergents in cleaning a wide variety of substrates, including laundry, hard surfaces and dish. The compositions contain a functionalized polymer which is prepared by reacting: i) a styrene/maleic anhydride copolymer and ii) a poly(oxyalkylene) monoamine. Compositions according to the disclosed technology have good cleaning performance and beneficial anti-redeposition properties.

8 Claims, No Drawings

(56) References Cited

U.S. PATENT DOCUMENTS

| | | | | |
|---|---|---|---|---|
| 2013/0289185 A1* | 10/2013 | Oya | .................... | C09D 11/033 |
| | | | | 524/389 |
| 2015/0152211 A1* | 6/2015 | Gobelt | .................. | C08F 267/02 |
| | | | | 524/549 |
| 2016/0130533 A1* | 5/2016 | Castle | .................. | C11D 3/0036 |
| | | | | 510/400 |
| 2017/0158838 A1* | 6/2017 | Piestert | .............. | C08G 18/5024 |
| 2018/0360026 A1* | 12/2018 | Stern | ...................... | A01N 37/22 |

* cited by examiner

REDEPOSITION INHIBITING STYRENE MALEIC ANHYDRIDE COPOLYMERS AND DETERGENT COMPOSITIONS CONTAINING SAME

CROSS REFERENCE TO RELATED APPLICATION

This application claims priority from PCT Application Serial No. PCT/US2020/061176 filed on Nov. 19, 2020, which claims the benefit of U.S. Provisional Application No. 62/937,471 filed on Nov. 19, 2019, both of which are incorporated in their entirety by reference herein.

FIELD OF THE TECHNOLOGY

The present technology relates to polymeric additives and their incorporation into cleaning compositions useful in household detergents and other related uses including, dishwash (institutional and consumer), hard surface cleaners and textile care. The disclosed cleaning compositions include a detersive agent and a soil anti-redeposition agent. In one aspect, the disclosed technology relates to functional polymeric additives having enhanced soil redeposition inhibiting properties and laundry detergent compositions containing the polymers. The redeposition inhibiting polymers are selected from a functionalized polymer prepared by reacting: i) a styrene/maleic anhydride copolymer and ii) a poly(oxyalkylene) monoamine. Further aspects of the disclosed technology concern a method for preventing redeposition of soil on textiles in laundry processes.

BACKGROUND

The primary purpose of a cleaner and detergent is to render fabrics, surfaces or substrates free from soils and stains. Laundry detergent compositions generally perform well in removing localized soil from fabrics. Soil (e.g., water-soluble stains, particulate stains, oily stains and combinations of one or more of the foregoing) removal is a function of a combination of factors, including, for example, the mechanical action of the wash process, the wetting action of the water, water temperature, the surfactant system and builders. Once removed from the fabric soils become suspended in the wash liquor. If the detergent composition has poor soil suspension properties, as the wash cycle continues, the suspended soil can irreversibly redeposit over a wider area of the fabric. As the fabric becomes exposed to successive wash cycles, it will eventually acquire a gray or dull appearance which is aesthetically undesirable. Moreover, the detergent product will be perceived by the consumer as ineffective.

To minimize these problems, laundry detergent manufacturers incorporate anti-redeposition agents into their detergent products. Soil anti-redeposition agents are polymers that improve the whiteness or brightness of fabrics washed with the detergent by suspending the soil in the wash liquor after removal from the fabric and preventing soil redeposition onto the fabric during the remainder of the wash cycle.

There are many known polymeric anti-redeposition agents. Typical examples include carboxymethyl cellulose (CMC), modified cellulose ethers, polyesters, polyethylene glycol polyester copolymers, hydroxyl terminated polyurethanes, polyacrylic acids, polyacrylic copolymers, polymers of vinylidene ester/unsaturated acids or anhydrides, polymers of styrene/maleic anhydride, fluorocarbons, styrenic acrylates, poly(ethylene glycol-co-vinyl acetate), and their salts. These polymers are water-soluble and are typically negatively charged.

U.S. Pat. No. 7,741,264 discloses an anionic surface-active water-soluble polymer prepared by the free-radical addition polymerization of a polymerizable amide with copolymerizable monomers having vinylic or allylic unsaturation. Preferred polymerizable comonomers include acrylic acid, methacrylic acid, acrylamide, styrene, alpha-methyl styrene butyl acrylate and ethylhexyl acrylate. The polymerizable amide is prepared by the reaction of a polyoxyalkyleneamine with maleic anhydride. The anhydride ring-opens to form the corresponding amide and pendant carboxyl functionality. The unsaturation enables the amide to be free radically copolymerized with other unsaturated monomers. Polymers prepared from the unsaturated amide are anionic due to the recurring carboxyl groups on the polymer backbone.

Unfortunately, many of the known anti-redeposition polymers are sparingly soluble in today's low water containing, highly concentrated liquid detergents which negatively impacts the transparency of the product and/or cause phase separation. In addition, these negatively charged polymers are incompatible with positively charged additives, such as quaternium compounds used as surfactants, disinfectants and deodorants and polyquaternium fabric softening polymers which are used in 2-in-1 detergent formulations. Such phenomena are commercially unacceptable, especially for detergents that are marketed in transparent containers.

Carboxymethyl cellulose is a popular and widely used anti-redeposition agent. Many commercially available detergent compositions contain CMC. However, it is known that the anti-redeposition efficacy of CMC is achieved only with cotton fabrics and that CMC has essentially no anti-redeposition effect when the fabric to be washed is a synthetic fabric or a synthetic-cotton blend. The degree of redeposition of the suspended soil varies with the character of the fabric which in turn is somewhat dependent on the nature of fiber making up the fabric. Soil is typically hydrophobic. The more hydrophilic the surface of the fiber (e.g., cotton) being washed, the less is the redeposition of the soil suspended in the wash water. Conversely, the more hydrophobic the surface of the fiber (e.g., a synthetic) being washed, the greater is the redeposition of soil. Anti-redeposition agents that have been found to be effective on cotton fabrics are not necessarily effective on synthetic fabrics. As a practical matter the ordinary load of clothes to be laundered consists of a mixture of different fabric types, such as, cotton fabrics, synthetic fabrics, and synthetic-cotton blend fabrics. Accordingly, an anti-redeposition agent effective with cotton, synthetic and cotton-synthetic blend fabrics is desired.

SUMMARY OF THE TECHNOLOGY

In accordance with one aspect of the present technology, a cleaning composition is provided comprising: a) at least one surfactant; and b) a functionalized styrene/maleic anhydride polymer composition comprising the reaction product of: i) a styrene/maleic anhydride copolymer; ii) a poly(oxyalkylene) monoamine; and optionally iii) a poly(oxyalkylene) diol.

In accordance with another aspect of the disclosed technology, a laundry detergent composition is provided for mitigating the redeposition of soil removed from fabrics during the wash cycle of a laundering process, said detergent comprising: a) one or more of anionic, cationic, nonionic, amphoteric, or zwitterionic surfactants; and b) a functionalized polymer composition comprising the reaction product of: i) a styrene/maleic anhydride copolymer; ii) a poly(oxyalkylene) monoamine; and optionally iii) a poly(oxyalkylene) diol.

In accordance with another aspect of the present technology, a laundry detergent composition is provided for mitigating the redeposition of soil removed from fabrics during the wash cycle of a laundering process, said detergent comprising: a) one or more of anionic, cationic, nonionic, amphoteric, or zwitterionic surfactants; b) a functionalized styrene/maleic anhydride polymer composition comprising the reaction product of: i) a styrene/maleic anhydride copolymer; ii) a poly(oxyalkylene) monoamine; and optionally iii) a poly(oxyalkylene) diol; and c) a polyquaternium compound.

In accordance with another aspect of the present technology, a cleaning composition is provided for mitigating the redeposition of soil removed from hard surfaces during the cleaning process, said cleaning comprising: a) one or more of anionic, cationic, nonionic, amphoteric, or zwitterionic surfactants; b) a functionalized styrene/maleic anhydride polymer composition comprising the reaction product of: i) a styrene/maleic anhydride copolymer; and ii) a poly(oxyalkylene) monoamine; and optionally iii) a poly(oxyalkylene) diol; and c) a quaternium compound.

In accordance with another aspect of the present technology, a dish wash detergent is provided for mitigating the redeposition of soil removed from dishware, glassware, cookware, utensils, etc., during the automatic or manual wash cycle of a dishwashing process, said detergent comprising: a) one or more of anionic, cationic, nonionic, amphoteric, or zwitterionic surfactants; and b) a functionalized styrene/maleic anhydride polymer composition comprising the reaction product of: i) a styrene/maleic anhydride copolymer; ii) a poly(oxyalkylene) monoamine; and optionally iii) a poly(oxyalkylene) diol.

The cleansing composition of the disclosed technology is phase stable, optically clear and mitigates the redeposition of removed soils onto the cleaned substrate.

DETAILED DESCRIPTION OF THE DISCLOSED TECHNOLOGY

Aspects according to the present technology are described hereinafter. Various modifications, adaptations or variations of such exemplary aspects described herein may become apparent to those skilled in the art as such are disclosed. It will be understood that all such modifications, adaptations or variations that rely on the teachings of the present technology, and through which these teachings have been advanced in the art, are within the scope and spirit of the disclosed technology.

The terms "anti-redeposition agent", "anti-redeposition polymer", "functionalized polymer" and "functionalized styrene/maleic anhydride polymer" of the disclosed technology are used interchangeably and are prepared by reacting a styrene/maleic anhydride copolymer with a poly(oxyalkylene) monoamine and an optional poly(oxyalkylene) diol as is further described below.

The term "acid number" refers to the number of milligrams of potassium hydroxide necessary to neutralize the carboxyl groups in a 1-gram sample of the functionalized polymer of the disclosed technology.

Unless otherwise noted, all component or composition levels provided herein are made in reference to the active level of that component or composition, and are exclusive of residual diluents, solvents, additives or by-products, which may be present in commercially available sources.

Unless otherwise stated, all percentages, parts, and ratios expressed herein are based upon the total weight of the components contained in the fabric softening compositions of the disclosed technology.

While overlapping weight ranges for the various components, ingredients, and adjuvants that can be contained in the compositions have been expressed for selected embodiments and aspects of the disclosed technology, it should be readily apparent that the specific amount of each component in the disclosed compositions/copolymers will be selected from its disclosed range such that the amount of each component/monomer is adjusted such that the sum of all components in the composition will total 100 weight percent. The amounts employed will vary with the purpose and character of the desired product and can be readily determined by one skilled in the art.

It is to be understood that the upper and lower amount, range, and ratio limits set forth herein may be independently combined. Similarly, the ranges and amounts for each component of the disclosed technology can be used together with ranges or amounts for any of the other components.

As defined herein, "stable" and "stability" means that no visible phase separation is observed for a period of at least about one week of storage, or at least about 1 month of storage, or at least about 6 months of storage at ambient room temperature (20 to about 25° C.). In another aspect, the products of the disclosed technology show no visible phase separation after about at least four weeks, or at least about 6 weeks, or at least about 8 weeks of storage at elevated temperature ($\approx$45° C.).

As used herein, the term "optically clear" refers to compositions of the present technology having turbidity value that is equal to or less than about 52 NTU, equal to or less than about 50 NTU, equal to or less than about 40 NTU, equal to or less than about 30 NTU, equal to or less than about 20 NTU as measured by the Turbidity Test described in the test protocol below (a lower NTU value relates to a composition that is clearer than a composition having a higher NTU value).

The cleansing compositions containing the functionalized polymer of the disclosed technology may suitably comprise, consist essentially of, or consist of, the components, elements, and process delineations described herein. The disclosed technology illustratively disclosed herein suitably may be practiced in the absence of any element which is not specifically disclosed herein. As used herein, the expression "consisting essentially of" permits the inclusion of substances that do not materially affect the basic and novel characteristics of the composition under consideration.

The cleaning composition of the disclosed technology comprises:
a) at least one surfactant;
b) a functionalized polymer that is prepared by reacting:
 i) a styrene/maleic anhydride copolymer;
 ii) a poly(oxyalkylene) monoamine; and optionally
 iii) a poly(oxyalkylene) diol.

Styrene/Maleic Anhydride Copolymer

The functionalized polymer useful as the anti-redeposition agent in the detergent composition of the present technology comprises the reaction product of: i) a styrene/maleic anhydride copolymer base resin; and ii) a poly(oxyalkylene) monoamine. In one aspect, styrene/maleic anhydride copolymers can be represented by the formula:

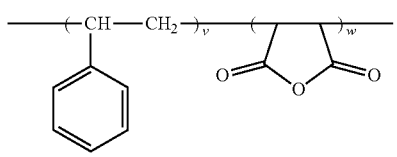

In one aspect, the molar ratio of styrene repeating unit residues represented by "v" to maleic anhydride repeating unit residues represented by "w" range from about 1:1 to about 8:1, or about 2:1, or about 3:1, or about 4:1, or about 6:1 or about 7:1. In one aspect, the molecular weight (Mw) of the styrene/maleic anhydride copolymer ranges from about 3000 to about 120,000 Da, or from about 3300 to about 80,000 Da, or from about 4500 to about 30.00 Da, or from about 5,000 to about 12,000 Da. Copolymers of styrene/maleic anhydride are known in the art and are commercially available, for example, from Total Cray Valley, Exton PA, under the trade names SMA™ 1000, SMA 2000, SMA 3000 with styrene to maleic anhydride repeating unit ratios of 1:1, 2:1 and 3:1, respectively, and SMA EF-30, SMA EF-40, SMA EF-60, and SMA EF-80, having styrene to maleic anhydride repeating unit ratios of 3:1, 4:1, 6:1 and 8:1, respectively. The styrene/maleic anhydride copolymer base resins can be in random, alternate or block configurations.

Poly(Oxyalkylene) Monoamine

In one aspect, the styrene/maleic anhydride copolymer base resin is functionalized with poly(oxyalkylene) monoamine. In one aspect, the poly(oxyalkylene) monoamine is a primary amine. In one aspect, the poly(oxyalkylene) moiety of the monoamine is poly(oxyethylene). In one aspect, the poly(oxyalkylene) moiety of the monoamine is poly(oxypropylene). In one aspect, the poly(oxyalkylene) moiety of the monoamine is a mixture of ethylene oxide and propylene oxide groups. The ethylene oxide and propylene oxide groups can be arranged in block or random configuration.

In one aspect, the poly(oxyalkylene) monoamine functionalizing agent can be represented by the formula:

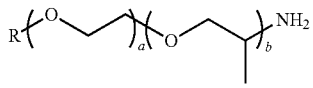

wherein R represents hydrogen or $C_1$ to $C_{10}$ alkyl; "a" represents a number from 0 to 75, or 1 to 60, or 5 to 50, or 15 to 45; and "b" represents a number from 0 to 50, or 1 to 40, or 2 to 35 or 10 to 30, subject to the proviso that a and b cannot be 0 at the same time. In one aspect R is hydrogen, methyl, ethyl, n-propyl, isopropyl, n-butyl, isobutyl, pentyl, neopentyl, and ethylhexyl. In one aspect, a is 15 to 60. In one aspect, b is 2 to 30. Poly(oxyalkylene) monoamines are commercially available from Huntsman Corporation, The Woodlands, TX, under the trade name Surfonamine™, product designations B-60, B-200, L-100, L-200, L207 and L-300. Under the Surfonamine B-series of products, R in the formula above is methyl and the ratio of ethylene oxide to propylene oxide is 1:9 and 6:29, respectively. Surfonamine L-series of products, R in the formula above is methyl and the ratio of ethylene oxide (EO) to propylene oxide (PO) is 19:3, 41:4, 33:10 and 58:8, respectively. The hydrophilic-hydrophobic character of the poly(oxyalkylene) monoamine can be controlled by the ratio of ethylene oxide to propylene oxide groups present in the monoamine. Higher ratios of ethylene oxide to propylene oxide groups will favor hydrophilic character, while the addition of propylene oxide groups to the poly(oxyalkylene) moiety will favor hydrophobic character.

Poly(Oxyalkylene) Diol

In one aspect, the styrene/maleic anhydride copolymer base resin is functionalized with poly(oxyalkylene) monoamine and a poly(oxyalkylene) diol. In one aspect, the poly(oxyalkylene) moiety of the diol is poly(oxyethylene). In one aspect, the poly(oxyalkylene) moiety of the diol is poly(oxypropylene). In one aspect, the poly(oxyalkylene) moiety of the diol is a mixture of ethylene oxide and propylene oxide groups. The ethylene oxide and propylene oxide groups can be arranged in block or in random configuration.

In one aspect, examples of poly(oxyalkylene) diols include, for example, poly(ethylene oxide) diols, poly(propylene oxide) diols, poly(ethylene oxide-co-propylene oxide) diols, poly(ethylene oxide-block-propylene oxide) diols, and combinations thereof.

In one aspect, the poly(oxyalkylene) diol functionalizing agent can be represented by the formula:

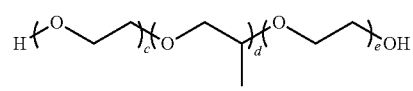

wherein "c" represents a number from 0 to 75, or 1 to 60, or 5 to 50, or 15 to 45; "d" represents a number from 0 to 50, or 1 to 40, or 2 to 35 or 10 to 30; and "e" represents a number from 0 to 75, or 1 to 60 or 5 or 50, or 15 to 45, subject to the proviso that c, d, and e cannot be 0 at the same time.

In one aspect, the number average molecular weight (Mn) of the poly(alkylene oxide) diol ranges from about 600 to about 12,000 Daltons, or from about 800 to about 8,000 Daltons, or from about 1000 to about 5,000 Daltons, or from about 1500 to about 4000 Daltons.

Functionalized Polymer

In one aspect, the reaction of the styrene/maleic anhydride base resin and the poly(oxyalkylene) monoamine functionalizing agent can be schematically represented as follows:

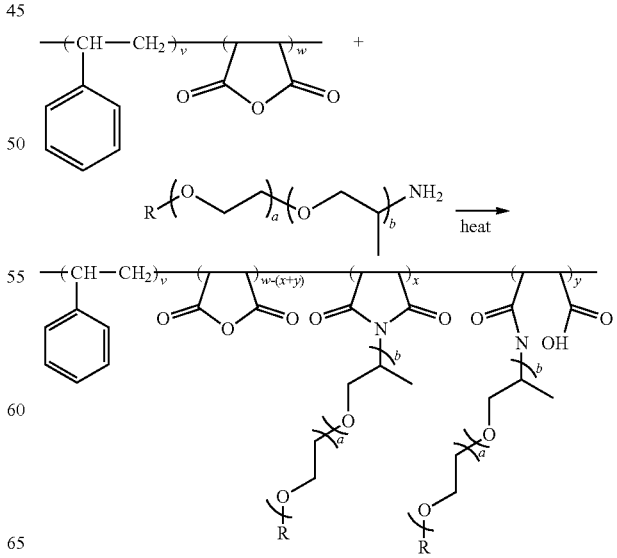

The amine nitrogen of the poly(oxyalkylene) monoamine reacts with the anhydride repeating unit of the styrene/maleic anhydride copolymer to give the imide represented by repeating unit "x" and/or the amide represented by repeating unit "y". In one aspect, some of the anhydride repeating units remain unreacted and are represented by "w-(x+y)". The styrene repeating unit represented by "v" is carried over quantitatively from the styrene/maleic anhydride copolymer base resin. The R substituent and variables a and b are as previously defined.

When a poly(alkylene oxide) diol is included as a functionalizing agent, a hydroxyl group of the poly(oxyalkylene) diol will react with an anhydride repeating unit of the styrene/maleic anhydride copolymer in a ring-opening reaction to form the corresponding ester and carboxylic acid.

In the above schematic, it should be noted that the repeating units of the functionalized polymer product can be in random, alternate or block configuration and will depend on the configuration of the parent styrene/maleic anhydride base resin. For example, if the configuration of the parent base resin is random, then the functionalized polymer product would be in a random configuration as well, as the imide and/or amide and optional ester is formed via a graft reaction between the maleic anhydride residues of the base resin starting material and the poly(oxyalkylene) monoamine and optional poly(oxyalkylene) diol functionalizing agent(s).

The reaction of the styrene/maleic anhydride base resin with the poly(oxyalkylene) monoamine and optional poly(oxyalkylene) diol functionalizing agent(s) is conducted with conventional grafting techniques which are well-known in the art. In one aspect the grafting reaction is conducted in a suitable organic solvent or diluent at an elevated temperature. Suitable solvents include water, and mixtures thereof.

In one aspect, the temperature for the grafting reaction can range from about 100 to about 170° C., or from about 125 to about 165° C., or from about 140 to 160° C. Higher temperatures and reaction times favor the formation of the imide versus the amide. Reaction temperatures in excess of 165° C. are to be avoided as the reaction product darkens becoming aesthetically undesirable.

In one aspect of the disclosed technology, formation of the imide over the amide is desired. Reaction temperatures ranging from above about 140° C. and below about 160° C. drive the formation of the imide versus the amide and avoids the undesirable darkening of the final product.

The presence of the carboxylic acid group resulting from the ring-opening of the anhydride during the formation of the amide can be easily detected by measuring the acid number of the functionalized polymer. Thus, low acid numbers for the polymer are indicative of the desired imide product which is devoid of base titratable acid groups. It should be noted, however, should any residual maleic anhydride residues remain in the polymer product following the functionalization reaction, there is the possibility that the polymer would titrate base as the residual anhydride may potentially hydrolyze to the respective acid. Though, acid number values contributed by residual anhydride groups are low.

In one aspect, the acid number, as measured in mg of KOH necessary to neutralize the carboxyl groups in a 1-gram sample of the functionalized polymer ranges from about 0 to about 80 mg KOH/g, or from about 5 to about 55 KOH/g, or from about 10 to about 32 mg KOH/g.

The amount of functionalized polymer suitable to convey anti-redeposition properties to the cleansing compositions of the disclosed technology ranges from about 0.1 to about 10 wt. %, or from about 0.25 to about 7 wt. %, or from about 0.5 to about 5 wt. %, or from about 0.75 to about 3 wt. %, or from about 1 to about 2.5 wt. % (based on the weight of the total composition).

Detersive Surfactants

A conventional detergent composition may be used with the anti-redeposition agents of the present technology to prepare either a dry powdered detergent or a liquid detergent which exhibits soil anti-redeposition properties. Such a detergent composition may be formulated by employing a detersive surfactant conventionally employed in the home care art. The surfactant may be chosen from any of the anionic, cationic, nonionic, ampholytic or zwitterionic surfactants, which can be used alone or in combination to produce a detergent composition containing the anti-redeposition agent. The following description of materials represents only illustrations of the numerous surfactants which can find use with the anti-redeposition agent.

Anionic Surfactant

Anionic surfactants suitable for use in the present technology are surface active compounds which contain a long chain hydrocarbon hydrophobic group in their molecular structure and a hydrophile group, i.e., water solubilizing group such as carboxylate, sulfonate or sulfate group or their corresponding acid forms. The anionic surfactants include the alkali metal (e.g., sodium and potassium) water-soluble alkyl aryl sulfonates, alkyl sulfonates, alkyl sulfates and the alkyl polyether sulfates. They may also include fatty acid or fatty acid soaps. In one aspect, the anionic surfactant is the alkali metal, ammonium or alkanolamine salts of alkyl aryl sulfonates and alkali metal, ammonium or alkanolamine salts of alkyl sulfates. In one aspect, alkyl sulfates are those in which the alkyl groups contain 8 to 26 carbon atoms, or 12 to 22 carbon atoms, or 14 to 18 carbon atoms. The alkyl group in the alkyl aryl sulfonate contains 8 to 16 carbon atoms, or 10 to 15 carbon atoms. In one aspect, the alkyl aryl sulfonate is the sodium potassium or ethanolamine $C_{10}$ to $C_{16}$ benzene sulfonate, e.g., sodium linear dodecyl benzene sulfonate. Primary and secondary alkyl sulfates can be made by reacting long chain alpha-olefins with sulfites or bisulfites, e.g. sodium bisulfite. The alkyl sulfonates can also be made by reacting long chain normal paraffin hydrocarbons with sulfur dioxide and oxygen as described in U.S. Pat. Nos. 2,503,280, 2,507,088, 3,372,188 and 3,260,741 to obtain normal or secondary higher alkyl sulfates suitable for use as surfactant detergents.

The alkyl substituent is preferably linear, i.e., normal alkyl, however, branched chain alkyl sulfonates can be employed, although they are not as good with respect to biodegradability. The alkane, i.e., alkyl, substituent may be terminally sulfonated or may be joined, for example, to the 2-carbon atom of the chain, i.e., may be a secondary sulfonate. It is understood in the art that the substituent may be joined to any carbon on the alkyl chain. The higher alkyl sulfonates can be used as the alkali metal salts, such as sodium and potassium. In one aspect, salts are the sodium salts. In one aspect, the alkyl sulfonates are the $C_{10}$ to $C_{18}$ primary normal alkyl sodium and potassium sulfonates.

Mixtures of higher alkyl benzene sulfonates and higher alkyl sulfates can be used, as well as mixtures of higher alkyl benzene sulfonates and higher alkyl polyether sulfates.

The alkali metal or ethanolamine alkyl aryl sulfonate can be used in an amount ranging from about 0 to 70 wt. %, or from about 5 to about 50 wt. %, or from about 7 to 15 wt. % (based on the weight of the total composition).

The alkali metal or ethanolamine sulfate can be used in admixture with the alkylbenzene sulfonate in an amount ranging from about 0 to about 70 wt. %, or from about 5 to about 50 wt. % (based on the weight of the total composition).

Also, normal alkyl and branched chain alkyl sulfates (e.g., primary alkyl sulfates) may be used as the anionic component.

The alkyl polyether sulfates used in accordance with the present technology can be normal or branched chain alkyl and contain lower alkoxy groups which can contain two or three carbon atoms. In one aspect, the alkyl polyether sulfate is represented by the formula:

$$R^1\text{—}O\text{—}(CH_2CH_2O)_p\text{—}SO_3^-M^+$$

wherein $R^1$ is $C_8$ to $C_{20}$ alkyl, or $C_{10}$ to $C_{18}$ alkyl, or $C_{12}$ to $C_{15}$ alkyl; p is 2 to 8, or 2 to 6, or 2 to 4; and M is an alkali metal, selected from sodium and potassium, or an ammonium cation.

Examples of suitable alkyl polyether sulfates that can be used in accordance with the present technology are $C_{12-15}$ normal or primary alkyl triethoxy sulfate, sodium salt; n-decyl diethoxy sulfate, sodium salt; $C_{12}$ primary alkyl diethoxy sulfate, ammonium salt; $C_{12}$ primary alkyl triethoxy sulfate, sodium salt; $C_{15}$ primary alkyl tetraethoxy sulfate, sodium salt; mixed $C_{14-15}$ normal primary alkyl mixed tri- and tetraethoxy sulfate, sodium salt; stearyl pentaethoxy sulfate, sodium salt; and mixed $C_{10-18}$ normal primary alkyl triethoxy sulfate, potassium salt.

The alkyl polyether sulfates can be used in mixtures with each other and/or in mixtures with the above discussed higher alkyl benzene, sulfonates, or alkyl sulfates.

The alkali metal alkyl polyether sulfates can be used with the alkylbenzene sulfonate and/or with an alkyl sulfate, in an amount ranging from about 0 to about 70 wt. %, or from about 5 to about 50 wt. %, or from about 5 to about 20 wt. % (based on the weight of the total composition).

In one aspect of the disclosed technology, the anionic surfactant is selected from a fatty acid soap. This class of surfactant includes ordinary alkali metal soaps such as the sodium, potassium, ammonium and alkylolammonium salts of higher fatty acids containing from about 8 to about 24 carbon atoms, or from about 10 to about 20 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Also useful are the sodium and potassium salts of the mixtures of fatty acids derived from coconut oil and tallow, i.e., sodium or potassium tallow and coconut soap.

The fatty acid soap can be used in an amount ranging from about 0 to about 70 wt. %, or from about 0.5 to about 50 wt. %, or from about 1 to about 25 wt. %, or from about 5 to about 20 wt. %, or from about 10 to about 15 wt. % (based on the weight of the total composition).

Cationic Surfactant

Cationic surfactants are known in the art, and almost any cationic surfactant having at least one long chain alkyl group of about 10 to 24 carbon atoms is suitable in the present technology. Such compounds are described in "Cationic Surfactants", Jungermann, 1970, incorporated by reference.

Specific cationic surfactants which can be used as surfactants in the present technology are described in detail in U.S. Pat. No. 4,497,718, which is hereby incorporated by reference.

In one aspect, suitable cationic surfactants are monoalkyl quaternary ammonium surfactants conforming to the structure:

$$(R^{10})(R^{11})(R^{12})(R)N^+\text{ }A^-$$

wherein $R^{10}$, $R^{11}$, and $R^{12}$ are independently selected from a $C_1$-$C_3$ alkyl or hydroxyalkyl group (e.g., methyl, ethyl, propyl, hydroxymethyl, hydroxyethyl, hydroxypropyl); and R is selected from an alkyl group of from 6 to 22 carbon atoms in one aspect, 8 to 18 carbon atoms in another aspect, and 10 to 16 carbon atoms in still another aspect; and A is a salt-forming anion such as, for example, those selected from halogen, (e.g., chloride, bromide), acetate, citrate, lactate, glycolate, phosphate, nitrate, sulphate, and alkylsulfate (e.g., methosulfate).

In one aspect, the auxiliary cationic surfactant is a dialkyl quaternary ammonium compound corresponding to the general formula: $(R^{15})(R^{16})(R^{17})(R^{18})N^+CA^-$ wherein two of $R^{15}$, $R^{16}$, $R^{17}$ and $R^{18}$ are selected from an alkyl group containing from 12 to 22 carbon atoms or an aromatic, alkoxy, polyoxyalkylene, alkylamido, hydroxyalkyl, aryl or alkylaryl group having up to about 30 carbon atoms with or without an ester group; and the remainder of $R^{15}$, $R^{16}$, $R^{17}$ and $R^{18}$ are independently selected from an alkyl group containing from 1 to about 4 carbon atoms or an alkoxy, polyoxyalkylene, alkylamido, hydroxyalkyl, aryl or alkylaryl group having up to about 4 carbon atoms; and $CA^-$ is a salt-forming anion such as those selected from halogen, (e.g., chloride, bromide), acetate, citrate, lactate, glycolate, phosphate, nitrate, sulfonate, sulfate, alkylsulfate, and alkyl sulfonate (e.g., methosulfate and ethosulfate) moieties. The alkyl groups can contain, in addition to carbon and hydrogen atoms, ether and/or ester linkages, and other groups such as amino groups. The longer chain alkyl groups, e.g., those of about 12 carbons, or higher, can be saturated or unsaturated or branched. In one embodiment, two of $R^{15}$, $R^{16}$, $R^{17}$ and $R^{18}$ are selected from an alkyl group containing from 12 to 22 carbon atoms in one aspect, from 14 to 20 carbon atoms in another aspect, and from 16 to 18 carbon atoms in a further aspect; the remainder of $R^{15}$, $R^{16}$, $R^{17}$ and $R^{18}$ are independently selected from $CH_3$, $C_2H_5$, $C_2H_4OH$, and mixtures thereof. Any two of $R^{15}$, $R^{16}$, $R^{17}$, and $R^{18}$ together with the nitrogen atom to which they are attached can be taken together to form a ring structure containing 5 to 6 carbon atoms, one of said carbon atoms can optionally be replaced with a heteroatom selected from nitrogen, oxygen or sulfur. $CA^-$ is a salt-forming anion selected from halogen, (e.g. chloride, bromide), acetate, citrate, lactate, glycolate, phosphate, nitrate, sulfate, and alkylsulfate (e.g., methosulfate, ethosulfate).

Non-limiting examples of dialkyl quaternized ammonium compounds include dicocodimonium chloride; dicocodimonium bromide; dimyristyldimonium chloride; dimyristyldimonium bromide; dicetyldimonium chloride; dicetyldimonium bromide; dicetylmethylbenzylmonium chloride; distearyldimonium chloride; distearyldimonium bromide; dimetyldi(hydrogenated tallow)monium chloride; hydroxypropylbisstearylmonium chloride; distearylmethylbenzylmonium chloride; dibehenyl/diarachidyldimonium chloride; dibehenyl/diarachidyldimonium bromide; dibehenyldimonium chloride; dibehenyldimonium bromide; dibehenyldimonium methosulfate; dibehenylmethylbenzylmonium chloride; dihydrogenated tallow benzylmonium chloride;

dihydrogenated tallowethyl hydroxyethylmonium methosulfate; dihydrogenated tallow hydroxyethylmonium methosulfate; di-$C_{12}$-$C_{15}$ alkyldimonium chloride; di-$C_{12}$-$C_{18}$ alkyldimonium chloride; di-$C_{14}$-$C_{18}$ alkyldimonium chloride; dicocoylethyl hydroxyethylmonium methosulfate; disoyoylethyl hydroxyethylmonium methosulfate; dipalmitoylethyldimonium chloride; dihydrogenated palmoylethyl hydroxyethylmonium methosulfate; dihydrogenated tallowamidoethyl hydroxyethylmonium chloride; dihydrogenated tallowamidoethyl hydroxyethylmonium methosulfate; dihydrogenated tallowoylethyl hydroxyethylmonium methosulfate; distearoylethyl hydroxyethylmonium methosulfate; and Quaternium-82.

In one aspect, the cationic surfactant can be selected from an asymmetric dialkyl quaternary ammonium compound corresponding to the general formula: $(R^{20})(R^{21})(R^{22})(R^{23})N^+CA^-$ wherein $R^{20}$ is selected from an alkyl group containing from 12 to 22 carbon atoms or an aromatic, alkoxy, polyoxyalkylene, alkylamido, hydroxyalkyl, aryl or alkylaryl group containing up to about 22 carbon atoms; $R^{21}$ is selected from an alkyl group containing from 5 to 12 carbon atoms or an aromatic, alkoxy, polyoxyalkylene, alkylamido, hydroxyalkyl, aryl or alkylaryl group containing up to about 12 carbon atoms; $R^{22}$ and $R^{23}$ are independently selected from an alkyl group containing from 1 to about 4 carbon atoms or an aromatic, alkoxy, polyoxyalkylene, alkylamido, hydroxyalkyl, aryl or alkylaryl group containing up to about 4 carbon atoms; and $CA^-$ is a salt-forming anion such as, for example, halogen, (e.g. chloride, bromide), acetate, citrate, lactate, glycolate, phosphate, nitrate, sulfate, and alkylsulfate (e.g., methosulfate, ethosulfate). The alkyl groups can contain, in addition to carbon and hydrogen atoms, ether linkages, ester linkages, and other moieties such as amino groups. The longer chain alkyl groups, e.g., those of about 12 carbons, or higher, can be saturated or unsaturated and/or straight or branched. In one embodiment, $R^{20}$ is selected from a non-functionalized alkyl group containing from 12 to 22 carbon atoms in one aspect, from 14 to 20 carbon atoms in another aspect, and from 16 to 18 carbon atoms in a further aspect; $R^{21}$ is selected from a non-functionalized alkyl group containing from 5 to 12 carbon atoms in one aspect, from 6 to 10 carbon atoms in another aspect, and 8 carbon atoms in a further aspect; $R^{22}$ and $R^{23}$ are independently selected from $CH_3$, $C_2H_5$, $C_2H_4OH$, and mixtures thereof; and $CA^-$ is selected from Cl, Br, $CH_3OSO_3$, $C_2H_5OSO_3$, and mixtures thereof. In one aspect, $R^{20}$ is a straight, saturated non-functionalized alkyl group, and $R^{21}$ is a branched, saturated non-functionalized alkyl group. In one aspect, the branched group of $R^{21}$ is a straight, saturated alkyl group containing from 1 to 4 carbon atoms, and in another aspect, $R^{21}$ is an alkyl group containing 2 carbon atoms.

Non-limiting examples of asymmetric dialkyl quaternized ammonium salt compounds include: stearylethylhexyldimonium chloride, stearylethylhexyldimonium bromide; stearyl ethylhexyl dimonium methosulfate; cetearyl ethylhexyldimonium methosulfate.

The cationic surfactant can be used in the cleansing composition in an amount ranging from 0 to about 20 wt. %, or from about 0.1 to 15 wt. %, or from about 0.5 to about 10 wt. %, or from about 1 to about 5 wt. % (based on the weight of the total composition).

Nonionic Surfactant

The nonionic surfactants are surface-active agents that do not ionize in solution and the whole molecule acts as a cleaning agent. Those compounds which can generally be used in the present technology can be broadly defined as compounds produced by the condensation of alkyl oxide groups, which are hydrophilic in nature, with an organic hydrophobic compound, which may be aliphatic or aromatic in nature. The most widely used class of nonionic synthetic detergents include those which are formed by condensing ethylene oxide and/or propylene oxide with a hydrophobic base. However, other suitable nonionic organic synthetic detergent compounds, including the polyethylene oxide condensates of alkyl phenols, as well as condensation products of materials such as ethylene oxide and the product resulting from the reaction of propylene oxide with ethylene oxide, the long chain tertiary amine oxides and the long chain alkyl phosphates, may all be used in the cleansing composition. In addition, the fatty acid ester alkoxylates are suitable nonionic surfactants.

In one aspect, the nonionic surfactants are polyalkoxylated lipophiles wherein the desired hydrophile-lipophile balance is obtained from addition of a hydrophilic poly (lower alkoxy) group to a lipophilic moiety. In one aspect, a class of nonionic surfactant is the alkoxylated alkanols wherein the alkanol contains 9 to 20 carbon atoms and the number of moles of alkylene oxide (of 2 or 3 carbon atoms) is from 3 to 20. In one aspect, the alkanol is a fatty alcohol of 9 to 11 or 12 to 15 carbon atoms and which contain from 5 to 8 or 5 to 9 alkoxy groups per mole. Such surfactants are commercially available from Huntsman Corporation or Sasol North America, Houston, TX.

Exemplary of such compounds are those wherein the alkanol contains 10 to 15 carbon atoms and about 5 to 12 ethylene oxide groups per mole, commercially available under the trade names. Neodol™ 25-9 and Neodol 23-6.5, from Shell Chemicals, Houston, TX. The former is a condensation product of a mixture of higher fatty alcohols averaging about 12 to 15 carbon atoms, with about 9 moles of ethylene oxide and the latter is a corresponding mixture wherein the carbon atoms content of the higher fatty alcohol is 12 to 13 and the number of ethylene oxide groups present averages about 6. 5. The higher alcohols are primary alkanols. Another subclass of alkoxylated surfactants which can be used contain a precise alkyl chain length rather than an alkyl chain distribution of the alkoxylated surfactants described above. Typically, these are referred to as narrow range alkoxylates. Examples of these include the Neodol-1 series of surfactants available from the Shell Chemicals.

Other useful nonionics are the reaction products of a higher linear alcohol and a mixture of ethylene and propylene oxides, containing a mixed chain of ethylene oxide and propylene oxide, terminated by a hydroxyl group. Examples include $C_{13}$-$C_{15}$ fatty alcohol condensed with 6 moles ethylene oxide and 3 moles propylene oxide, $C_{13}$-$C_{15}$ fatty alcohol condensed with 7 moles propylene oxide and 4 moles ethylene oxide, $C_{13}$-$C_{15}$ fatty alcohol condensed with 5 moles propylene oxide and 10 moles ethylene oxide or mixtures of any of the above. These surfactants are commercially available from BASF Corporation, Florham Park, NJ, under the Plurafac trade name.

Another group nonionic surfactant is an ethoxylated $C_9$-$C_{11}$ fatty alcohol with an average of 5 moles ethylene oxide and an ethoxylated $C_{12}$-$C_{15}$ fatty alcohol with an average of 7 moles ethylene oxide per mole of fatty alcohol commercially available from Shell Chemicals under the Dobanol™ 91-5 and Dobanol 25-7 trade names, respectively.

Another class of nonionic surfactants which can be used in accordance with this invention are glycoside and polyglycoside surfactants. Glycoside and polyglycoside surfactants suitable for use in accordance with the present invention include those of the formula:

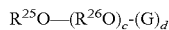

$$R^{25}O-(R^{26}O)_c-(G)_d$$

wherein $R^{25}$ is a monovalent organic radical containing from about 6 to about 30, or from about 8 to about 18 carbon atoms; $R^{26}$ is a divalent hydrocarbon radical containing from about 2 to 4 carbons atoms; "c" is a number having an average value of from 0 to about 12; "G" is a moiety derived from a reducing saccharide containing 5 or 6 carbon atoms; and "d" is a number having an average value of from 1 to about 10, or from about 1.3 to about 4. In one aspect, $R^{25}$ is a monovalent organic radical (linear or branched) containing from about 6 to about 18 carbon atoms; c is zero; G is glucose, or a moiety derived from glucose.

Suitable commercially available glycoside and polyglycoside surfactants include, for example, those derived from glucose which are available from BASF Corporation under the trade names APG™ 225 (a $C_8$-$C_{12}$ alkyl polyglycoside with a degree of polymerization of about 1.7), APG 325 (a $C_9$-$C_{11}$ alkyl polyglycoside with a degree of polymerization of about 1.5), APG 425 (a $C_8$-$C_{16}$ alkyl polyglycoside with a degree of polymerization of about 1.6), and APG 625 (a $C_{12}$-$C_{16}$ alkyl polyglycoside with a degree of polymerization of about 1.6).

Also, suitable as nonionic surfactants are polyhydroxy fatty acid amide surfactants of the formula:

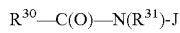

$$R^{30}-C(O)-N(R^{31})-J$$

wherein $R^{30}$ is H, or $R^{31}$ is $C_1$-$C_4$ hydrocarbyl, 2-hydroxyethyl, 2-hydroxypropyl or a mixture thereof, $R^{30}$ is $C_5$-$C_{31}$ hydrocarbyl, and J is a polyhydroxyhydrocarbyl having a linear hydrocarbyl chain with at least 3 hydroxyls directly connected to the chain, or an alkoxylated derivative thereof. In one aspect, $R^{31}$ is methyl, $R^{30}$ is a straight $C_{11}$-$C_{15}$ alkyl or alkenyl chain such as coconut alkyl or mixtures thereof, and J is derived from a reducing sugar such as glucose, fructose, maltose, lactose, in a reductive amination reaction.

In one aspect, the amine oxides which can be used as a surfactant are compounds corresponding to the formula $R^{50}(OR^{51})_n(R^{42})_2N\rightarrow O$ in which $R^{50}$ is selected from an alkyl, a hydroxyalkyl, and an acylamidopropoyl group containing from 8 to 22 carbon atoms in one aspect, and from 10 to 16 carbon atoms in another aspect; $R^{51}$ is an alkylene or hydroxyalkylene group containing 2 to 3 carbon atoms in one aspect, and 2 carbon atoms in another aspect; n is from about 0 to about 5; and $R^{42}$ is an alkyl or hydyroxyalkyl group containing from 1 to 3 carbon atoms in one aspect, and from 1 to 2 carbon atoms in another aspect (e.g., methyl, ethyl, and 2-hydroxyethyl), or a polyethylene oxide group containing from 1 to 3, ethylene oxide groups; and the arrow designates a semi-polar bond. In one aspect, $R^{40}$ is a $C_{12}$-$C_{18}$ primary alkyl group; n is 0; and $R^{42}$ is methyl.

Exemplary amine oxide surfactants include dimethyloctylamine oxide, diethyldecylamine oxide, bis-(2-hydroxyethyl) dodecylamine oxide, dimethyldodecylamine oxide, dipropyltetradecylamine oxide, methylethylhexadecylamine oxide, dodecylamidopropyl dimethylamine oxide, dimethyltetradecylamine oxide, cetyl dimethylamine oxide, stearyl dimethylamine oxide, tallow dimethylamine oxide and dimethyl-2-hydroxyoctadecylamine oxide.

Another class of nonionic surfactants, which are used either as the sole nonionic surfactant or in combination with other nonionic surfactants, in particular, together with alkoxylated fatty alcohols and/or alkyl glycosides, are alkoxylated, e.g., ethoxylated or ethoxylated and propoxylated fatty acid alkyl esters preferably containing 1 to 4 carbon atoms in the alkyl chain, more particularly the fatty acid methyl esters which are described, for example, in Japanese Patent Application JP-A-58/217598 or which are produced by the process described in International Patent Application WO-A-90/13533. Methyl esters of $C_{12}$-$C_{18}$ fatty acids containing an average of 3 to 15 ethylene oxide groups, or an average of 5 to 12 ethylene oxide groups.

Other nonionic surfactants which may be used include polyhydroxy amides as disclosed in U.S. Pat. No. 5,312,954 and aldobionamides such as disclosed in U.S. Pat. No. 5,389,279, both of which are hereby incorporated by reference.

Mixtures of two or more of the above disclosed nonionic surfactants can be used in the practice of the disclosed technology.

In one aspect, the nonionics can comprise from 0 to about 50 wt. %, or from about 5 to about 40 wt. %, or from about 5 to 25 wt. % of the composition (based on the total weight of the composition).

Ampholytic Surfactant

Ampholytic surfactants are broadly described aliphatic derivatives of heterocyclic secondary and tertiary amines in which the aliphatic radical may be straight chain or branched and wherein one of the aliphatic substituents contains from about 8 to 18 carbon atoms and at least one contains an anionic water-soluble group, e.g., carboxylate, sulfonate, sulfate. Examples of compounds falling within this definition are sodium 3-(dodecylamino) propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis (2-hydroxyethyl)-2-sulfato-3-dodecoxypropylamine.

Zwitterionic Surfactants

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. The cationic atom in the quaternary compound can be part of a heterocyclic ring. In all of these compounds, there is at least one aliphatic group, straight chain or branched, containing from about 3 to 18 carbon atoms and at least one aliphatic substituent containing an anionic water-solubilizing group, e.g., carboxy, sulfonate, sulfate, phosphate, or phosphonate.

In one aspect, suitable zwitterionic surfactants include but are not limited to amino acids (e.g., N-alkyl amino acids and N-acyl amino acids), betaines, sultaines, and alkyl amphocarboxylates. The betaines and sultaines useful in the compositions of the present technology are selected from alkyl betaines, alkylamino betaines, and alkylamido betaines, as well as the corresponding sulfobetaines (sultaines) represented by the formulas:

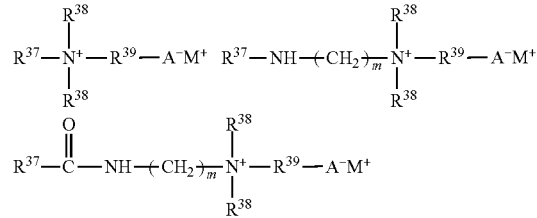

wherein $R^{37}$ is a $C_7$-$C_{22}$ alkyl or alkenyl group, each $R^{38}$, independently, is a $C_1$-$C_4$ alkyl group, $R^{39}$ is a $C_1$-$C_5$ alkylene group or a hydroxy substituted $C_1$-$C_5$ alkylene group, n is an integer from 2 to 6, A is a carboxylate group (betaine) or sulfonate group (sultaine), and M is a salt forming cation. In one aspect, $R^{37}$ is a $C_{11}$-$C_{18}$ alkyl group or a $C_{11}$-$C_{18}$ alkenyl group. In one aspect, $R^{38}$ is methyl. In one aspect, $R^{39}$ is methylene, ethylene or hydroxy propylene. In one aspect, n is 3. In a further aspect, M is selected from sodium, potassium, magnesium, ammonium, and mono-, di- and triethanolamine cations.

Examples of suitable betaines and sultaines include, but are not limited to, lauryl betaine, coco betaine, oleyl betaine, coco hexadecyl dimethylbetaine, coco dimethyl carboxymethyl betaine, lauryl dimethyl carboxymethyl betaine, cetyl dimethyl carboxymethyl betaine, lauryl amidopropyl betaine, cocoamidopropyl betaine (CAPB), coco dimethyl sulfopropyl betaine, stearyl dimethyl sulfopropyl betaine, lauryl dimethyl sulfoethyl betaine, and cocamidopropyl hydroxysultaine.

The alkylamphocarboxylates such as the alkylamphoacetates and alkylamphopropionates (mono- and disubstituted carboxylates) can be represented by the formula:

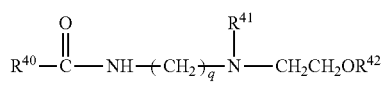

wherein $R^{40}$ is a $C_7$-$C_{22}$ alkyl or alkenyl group, $R^{41}$ is —$CH_2C(O)O^-M^+$, —$CH_2CH_2C(O)O^-M^+$, or —$CH_2CH(OH)CH_2SO_3^-M^+$, $R^{42}$ is hydrogen or —$CH_2C(O)O^-M^+$, and M is a cation selected from sodium, potassium, magnesium, ammonium, and the ammonium salt of mono-, di- and triethanolamine.

Exemplary alkylamphocarboxylates include, but are not limited to, sodium cocoamphoacetate, sodium lauroamphoacetate, sodium capryloamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate.

In one aspect, the ampholytic and zwitterionic surfactants can be used in amounts ranging from 0 to about 50 wt. %, or from about 0.5 to about 15 wt. %, or from about 1 to about 10 wt. %, or from about 2 to about 5 wt. % (based on the total weight of the composition).

A wide variety of detergents and cleaning compositions can be made that include the anti-redeposition agents of the present technology, with or without other ingredients as described below. Formulations are contemplated that include from about 0.5 to about 99 wt. %, or from about 1 to about 60 wt. %, or from about 2 to about 30 wt. %, or from about 3 to about 20 wt. %, or from about 5 to about 15 wt. % of one or more of the disclosed detersive surfactants.

In one aspect, the cleaning composition includes an anti-redeposition agent as described herein, a detersive surfactant(s) and aqueous diluent or carrier (in the case of liquid dosage forms), in addition to one or more "other components" that are known by those of ordinary skill in the art to be useful in formulating soaps, cleaning compositions, hard surface cleaners, laundry and dish detergents, and the like. The term "other components" means any material which a formulator of ordinary skill in the soap, detergent and cleanser arts recognizes as adding a benefit to the physical performance, aroma, or aesthetics of a formulation that is intended to be used as a cleaning composition, regardless of the substrate that is intended to be cleansed. Other components (adjuvants or benefit agents) useful in the detergents and cleansers of the present technology include without limitation one or more materials selected from builders, electrolytes, bleaches, bleach activators, enzymes, nonaqueous cosolvents, pH adjusting agents, perfume, perfume carriers, fluorescent brighteners, suds suppressors, hydrotropes, auxiliary anti-redeposition agents, optical brighteners, dye transfer inhibitors, antimicrobial active ingredients, auxiliary rheology modifiers, antioxidants, corrosion inhibitors, fabric softeners, fluorescent whitening agents, and UV absorbers.

Cleaning Compositions

Cleaning compositions and detergents containing the anti-redeposition agent of the present technology include any composition that is suited for cleaning any object, item, substrate and/or surface. Such compositions include, but are not limited to, cleaning compositions in the form of liquids, solids and/or pastes (e.g., liquids, powders, granules, flakes, tablets, gels, bars, sticks, sprays, sachets, pods, unit dose, etc.) for use in hard surface cleaning compositions and formulations, such as for glass, wood, ceramic, metal, counter tops, floors and windows; carpet cleaners, oven cleaners; and in fabric cleaning (e.g., laundry detergent boosters, detergent compositions, laundry additive cleaning compositions, and laundry pre-spotter cleaning compositions, etc.); and dishwashing compositions, including hand or manual dishwash compositions (e.g., "hand" or "manual" dishwashing detergents) and automatic dishwashing compositions (e.g., "automatic dishwashing detergents").

The cleaning compositions include all-purpose or heavy-duty laundry detergents in liquid, granular, powder, gel, solid, tablet, or paste-form, including the so-called heavy-duty liquid (HDL) detergent or heavy-duty powder detergent (HDD) types, liquid fabric detergents.

In one aspect, the anti-redeposition agent of the present technology can be formulated into a liquid laundry detergent. In one aspect, the formulated liquid laundry detergent is a heavy-duty liquid (HDL) detergent. In one aspect, the HDL detergents according to the present technology will contain a lower amount of aqueous carrier compared to conventional liquid detergents. Typically the water content of the concentrated liquid composition is 80 wt. % or less, or 75 wt. % or less, or in another aspect 70 wt. % or less in still another aspect, 65 wt. % or less in a further aspect, 60 wt. % or less in a still further aspect, 55 wt. % or less in an additional aspect 40 wt. % or less in a still additional aspect, and 35 wt. % or less in a further additional aspect, based on the weight of the total composition.

Other Components

Aqueous Diluent/Carrier

In one aspect, the aqueous diluent or carrier comprises deionized water, although water from natural, municipal or commercial sources can be utilized if any mineral cations that may be present in such water do not deleteriously affect the intended function of any of the components contained in the cleaning composition. In one aspect, the amount of water (depending on the delivery form) can range from about 0.5 to about 99.5 wt. %.

Cosolvent

In addition to water, the aqueous carrier can comprise water miscible cosolvents. Cosolvents can aid in the dissolution of various nonionic laundry detergent adjuvants that require dissolution in the liquid phase. Suitable cosolvents include the lower alcohols such as ethanol and isopropanol but can be any lower monohydric alcohol containing up to 5 carbon atoms. Some or all of the alcohol may be replaced with dihydric or trihydric lower alcohols or glycol ethers which in addition to providing solubilizing properties and reducing the flash point of the product, also can provide anti-freezing attributes as well as to improve the compatibility of the solvent system with particular laundry detergent adjuvants. Exemplary dihydric and trihydric lower alcohols and glycol ethers are glycol, propanediol (e.g., propylene glycol, 1,3-propane diol), butanediol, glycerol, diethylene glycol, propyl or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl ether monoethyl ether, diisopropylene glycol monomethyl ether, diisopropylene glycol monoethyl ether, methoxytriglycol, ethoxytriglycol, butoxytriglycol, isobutoxyethoxy-2-propanol, 3-methyl-3-methoxybutanol, propylene glycol t-butyl ether, and mixtures of these solvents.

The amount of cosolvent(s) if utilized can range from about 0 to about 15 wt. % in one aspect, from about 0.5 to about 10 wt. % in another aspect, and from about 1 to about 5 wt. % in a further aspect (based on the weight of the total composition).

Hydrotrope

The detergent compositions optionally comprise a hydrotrope to aid in the compatibility of the liquid detergent with water. In one aspect, suitable hydrotropes include but are not limited to the anionic hydrotropes such as, for example, the sodium, potassium, ammonium, monoethanolamine, and triethanolamine salts of benzene sulfonate, xylene sulfonate, toluene sulfonate, cumene sulfonate, and mixtures thereof. In one aspect, nonionic hydrotropes such as glycerin, urea and alkanolamines (e.g., triethanolamine) can be employed.

The amount of hydrotrope can range from about 0 to about 10 wt. % in one aspect, from about 0.1 to about 5 wt. % in another aspect, from about 0.2 to about 4 wt. % in a further aspect, and from about 0.5 to about 3 wt. % in a still further aspect (based on the weight of the total composition).

Builders/Electrolytes

In one aspect of the present technology, the detergent compositions may optionally comprise builders and electrolytes. The builder can be any material that can reduce the level of alkaline earth metal ions, particularly, magnesium and calcium in the wash water. Builders also can provide other beneficial properties such as generation of an alkaline pH and aiding in the suspension of soil removed from the fabric. The electrolyte that may be utilized can be any water-soluble salt. The electrolyte may also be a detergency builder, e.g., sodium tripolyphosphate, or it may be a non-functional electrolyte to promote the solubility of other electrolytes, for example, potassium salts can be used to promote the solubility of sodium salts enabling the amount of dissolved electrolyte to be increased considerably. Suitable builders include those which are commonly used in detergents, e.g., zeolites (aluminosilicate), crystalline and amorphous silicates, carbonates, phosphorous containing compositions, borates, as well as organic based builders.

A suitable zeolite or aluminosilicate which is useful in the compositions of the present technology is an amorphous water insoluble hydrated compound of the formula $(NaAlO_2)_x(SiO_2)_y$, wherein x is a number from 1.0 to 1.2 and y is 1, the amorphous material can be further characterized by a $Mg^{+2}$ exchange capacity of from about 50 mg eq. $CaCO_3$/g. and a particle diameter of from about 0.01 to about 5 μm (volume distribution; measurement method: Coulter counter). This ion exchange builder is more fully described in British Patent No. 1,470,250. In another aspect, a water insoluble synthetic aluminosilicate ion exchange material useful herein is crystalline and conforms to the formula $Na_z[(AlO_2)_y \cdot (SiO_2)]xH_2O$, wherein z and y are integers of at least 6; the molar ratio of z to y is in the range from 1.0 to about 0.5, and x is an integer from about 15 to about 264, the aluminosilicate ion exchange material can be further characterized as having a particle size diameter from about 0.1 to about 100 μm (volume distribution; measurement method: Coulter counter); a calcium ion exchange capacity on an anhydrous basis of at least about 200 mg equivalent of $CaCO_3$ hardness per gram; and a calcium exchange rate on an anhydrous basis of at least about 2 grains/gallon/minute/gram. These synthetic aluminosilicates are more fully described in British Patent No. 1,429,143.

In one aspect, suitable silicates include crystalline, sheet like sodium silicates having the general formula $MSi_xO_{2x+1} \cdot H_2O$, where M denotes sodium or hydrogen, x is a number from 1.9 to 4, and y is a number from 0 to 20. Crystalline silicates or phyllosilicates of this kind are described, for example, in European Patent Application EP-A-0 164 514. In one aspect, M is sodium and x represent a value of 2 or 3.

In one aspect, suitable silicates include amorphous sodium silicates having a $Na_2O:SiO_2$ modulus of from 1:2 to 1:3.3, and which are dissolution-retarded and have secondary detergency properties. The retardation of dissolution relative to conventional amorphous sodium silicates may have been brought about in a variety of ways, for example, by surface treatment, compounding, compacting or over drying.

Representative carbonates include alkali metal carbonates and bicarbonates, such as, for example, sodium carbonate, potassium carbonate, sodium sesquicarbonate, sodium bicarbonate and potassium bicarbonate.

Exemplary phosphorous containing compositions include the alkali metal pyrophosphates, orthophosphates, polyphosphates and phosphonates, specific examples of which are the sodium and potassium pyrophosphates, tripolyphosphates, phosphates, and hexametaphosphates.

Representative borates include the alkali metal borates such as sodium tetraborate.

Examples of organic based builders are (1) water-soluble amino polycarboxylates, e.g., sodium and potassium ethylenediaminetetraacetates, nitrilotriacetates and N-(2 hydroxyethyl)-nitrilodiacetates; (2) water-soluble salts of phytic acid, e.g., sodium and potassium phytates as set forth in U.S. Pat. No. 2,379,942; (3) water-soluble polyphosphonates, including the sodium, potassium and lithium salts of ethane-1-hydroxy-1,1-diphosphonic acid; the sodium, potassium and lithium salts of methylene diphosphonic acid; the sodium, potassium and lithium salts of ethylene diphosphonic acid; and the sodium, potassium and lithium salts of ethane-1,1,2-triphosphonic acid. Other examples include the alkali metal salts of ethane-2-carboxy-1,1-diphosphonic acid, hydroxymethanediphosphonic acid, carboxyldiphosphonic acid, ethane-1-hydroxy-1,1,2-triphosphonic acid, ethane-2-hydroxy-1,1,2-triphosphonic acid, propane-1,1,3,3-tetraphosphonic acid, propane-1,1,2,3-tetraphosphonic acid, and propane-1,2,2,3-tetraphosphonic acid; (4) the water-soluble salts of polycarboxylate polymers and copolymers as described in U.S. Pat. No. 3,308,067; and (5) polymers and copolymers containing structural units derived from itaconic acid, or an anhydride, ester or salt thereof alone or in combination with at least one of (meth)acrylic acid, and their anhydrides, esters and salts, AMPS and salts thereof) as described in International Patent Application Publication Nos. WO 2014/143773 and WO 2015/138872. The organic builders can be used alone or in admixture with other organic and/or inorganic builders.

In addition, mono- and polycarboxylate salts also are suitable, including the water-soluble salts of mellitic acid, citric acid, and carboxymethyloxysuccinic acid, imino disuccinate, salts of polymers and copolymers of itaconic acid and maleic acid, tartrate monosuccinate, tartrate disuccinate and mixtures thereof. Exemplary polycarboxylate salts are the sodium and potassium salts of citric acid and tartaric acid. In one aspect, the polycarboxylate salt is sodium citric acid, e.g., monosodium, disodium and trisodium citrate, or sodium tartaric acid, e.g., monosodium and disodium tartrate. An example of a monocarboxylate salt is sodium formate.

Other organic builders are polymers and copolymers of (meth)acrylic acid and maleic anhydride and the alkali metal salts thereof. More specifically such builder salts can consist of a copolymer which is the reaction product of about equal moles of methacrylic acid and maleic anhydride which has been completely neutralized to form the sodium salt thereof.

Suitable electrolytes for incorporation in the present compositions include inorganic salts. Non-limiting examples of suitable inorganic salts include: $MgI_2$, $MgBr_2$, $MgCl_2$, $Mg(NO_3)_2$, $Mg_3(PO_4)_2$, $Mg_2P_2O_7$, $MgSO_4$, magnesium silicate, NaI, NaBr, NaCl, NaF, $Na_3(PO_4)$, $NaSO_3$, $Na_2SO_4$, $Na_2SO_3$, $NaNO_3$, $NaIO_3$, $Na_3(PO_4)$, $Na_4P_2O_7$, sodium zirconate, $CaF_2$, $CaCl_2$, $CaBr_2$, $CaI_2$, $CaSO_4$, $Ca(NO_3)_2$, KI, KBr, KCl, KF, $KNO_3$, $KIO_3$, $K_2SO_4$, $K_2SO_3$, $K_3(PO_4)$, $K_4(P_2O_7)$, potassium pyrosulfate, potassium pyrosulfite, LiI, LiBr, LiCl, LiF, $LiNO_3$, $AlF_3$, $AlCl_3$, $AlBr_3$, $AlBr_3$, $AlI_3Al_2(SO_4)_3$, $Al(PO_4)$, $Al(NO_3)_3$, and including combinations of these salts or salts with mixed cations e.g. potassium alum $AlK(SO_4)_2$ and salts with mixed anions, e.g. potassium tetrachloroaluminate and sodium tetrafluoroaluminate.

The builders/electrolytes can be used in an amount ranging from 0 to about 20 wt. %, or from about 0.1 to about 10 wt. %, or from about 1 to about 8 wt. %, or from about 2 to about 5 wt. % (based on the total weight of the composition).

Chelation Agents

Chelation agents (chelators) can be employed to stabilize the softener compositions against the deleterious effects of metal ions. When utilized, suitable chelating agents include amino carboxylates, ethylene diamine-N,N'-disuccinate, amino phosphonates (where low levels of phosphorus are permitted), citric acid and salts thereof (e.g., sodium), and cyclodextrins.

Amino carboxylates useful as chelating agents include ethylenediaminetetraacetates (EDTA), N-hydroxyethylethylenediaminetriacetates, nitrilotriacetates (NTA), ethylenediamine tetraproprionates, ethylenediamine-N,N'-diglutamates, 2-hyroxypropylenediamine-N,N-disuccinates, triethylenetetraamine-hexacetates, diethylenetriaminepentaacetates (DETPA), and ethanoldiglycines, including their water-soluble salts such as the alkali metal, ammonium, and substituted ammonium salts thereof and mixtures thereof. Suitable amino phosphonates are also suitable for use as chelating agents in the compositions of the invention when at least low levels of total phosphorus are permitted in laundry compositions, and include ethylenediaminetetrakis (methylenephosphonates), diethylenetriamine-N,N,N',N'',N''-pentakis(methanephosphonate) (DETMP) and I-hydroxyethane-1,1-diphosphonate (HEDP).

Bleaching Agents and Activators

In one aspect, the liquid detergent compositions may optionally comprise bleaching agents and bleaching agent activators to improve the bleaching and cleansing characteristics of the composition. In one aspect, the bleaching agent is selected from an oxygen bleach. Oxygen bleaches liberate hydrogen peroxide in aqueous solution. Among the compounds which produce hydrogen peroxide in water and serve as bleaches are peroxygen compounds. Exemplary peroxygen compounds include sodium perborate tetrahydrate and sodium perborate monohydrate. Additional peroxygen compounds that can be used are, for example, sodium percarbonate, peroxypyrophosphates, citrate perhydrates, and peracidic salts or peracids, such as perbenzoates, peroxophthalates, diperazelaic acid, phthaloimino peracid or diperdodecanedioic acid.

In one aspect, the peroxygen compound is used in combination with an activator. The activator lowers the effective operating temperature of the peroxygen bleaching agent. Bleach activators which can be used are compounds which, under perhydrolysis conditions, produce aliphatic peroxocarboxylic acids having 1 to 10 carbon atoms in one aspect, and from 2 to 4 carbon atoms in another aspect, and/or optionally substituted perbenzoic acid in a further aspect. Substances which contain O- and/or N-acyl groups of the specified number of carbon atoms and/or optionally substituted benzoyl groups are suitable activators. In one aspect the activator is selected from polyacylated alkylenediamines such as tetraacetylethylenediamine (TAED); acylated triazine derivatives such as 1,5-diacetyl-2,4-dioxohexahydro-1,3,5-triazine (DADHT); acylated glycolurils such as tetraacetylglycoluril (TAGU); N-acylimides such as N-nonanoylsuccinimide (NOSI); acylated phenolsulfonates such as n-nonanoyl and isononanoyl oxybenzenesulfonate (n- or iso-NOBS); carboxylic acid anhydrides such as phthalic anhydride; acylated polyhydric alcohols such as glycerin triacetate, ethylene glycol diacetate and 2,5-diacetoxy-2,5-dihydrofuran.

In one aspect, when a bleaching agent is used, the compositions of the present technology are present in an amount ranging from about 0.1 to about 50 wt. %, or from about 0.5 to about 35 wt. %, or from about 0.75 to about 25 wt. % (based on the weight of the total weight of composition). The bleach activator is generally present in the composition in an amount ranging from about 0.1 to about 60 wt %, or from about 0.5 to about 40 wt. %, or from about 0.6 to about 10 wt. % (based on the total weight of the composition).

The bleach activator interacts with the peroxygen compound to form a peroxyacid bleaching agent in the wash water. In one aspect, a squestering agent of high complexing power is included in the composition to inhibit any undesired reaction between such peroxyacid and hydrogen peroxide in the wash solution in the presence of metal ions. Suitable sequestering agents for this purpose include the sodium salts of nitrilotriacetic acid (NTA), ethylene diamine tetraacetic acid (EDTA), diethylene triamine pentaacetic acid (DETPA), diethylene triamine pentamethylene phosphonic acid (DTPMP); and ethylene diamine tetramethylene phosphonic acid (EDITEMPA). The sequestering agents can be used alone or in admixture, the amount of which is conventionally known in the art.

To avoid loss of peroxide bleaching agent, e.g. sodium perborate, resulting from enzyme induced decomposition, such as by a catalase enzyme, the compositions may additionally include an enzyme inhibitor compound, i.e., a compound capable of inhibiting enzyme induced decomposition of the peroxide bleaching agent. Suitable inhibitor compounds are disclosed in U.S. Pat. No. 3,606,990, the relevant disclosure of which is incorporated herein by reference. In one aspect, a suitable enzyme inhibitor is hydroxylamine sulfate and other water-soluble hydroxylamine salts. The hydroxylamine salt inhibitors can be present in amounts as low as about 0.01 to 0.4 wt. %. Generally, however, suitable amounts of enzyme inhibitors can range up to about 15 wt. %, or from about 1 to about 10 wt. % (based on the total weight of the composition).

Enzymes

The detergent compositions of the present technology can optionally comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof.

Enzymes for use in compositions, for example, detergents can be stabilized by various techniques. The enzymes employed herein can be stabilized by the presence of water-soluble sources of calcium and/or magnesium ions in the finished compositions that provide such ions to the enzymes, or the enzymes can be adsorbed to carriers to protect them from premature degradation. In one aspect, enzymes can be employed in an amount ranging from about 0 to about 5 wt. %, or from about 0.1 to about 2.5 wt. % (based on the total weight of the composition).

Auxiliary Anti-Redeposition Agent

In addition to the functionalized styrene/maleic anhydride anti-redeposition polymer of the disclosed technology, the detergent compositions can optionally include an auxiliary anti-redeposition agent. Suitable auxiliary anti-redeposition agents are, but not limited to, water-soluble colloids, for example, gelatin, salts of ether sulfonic acids of starch or of cellulose or salts of acidic sulfuric acid esters of cellulose or of starch. Water-soluble polyamides comprising acidic groups are also suitable for this purpose. Furthermore, soluble starch preparations and starch products other than those mentioned above can be used, for example, degraded starch, aldehyde starches, etc. It is also possible to use polyvinylpyrrolidone, polyvinyl alcohol and fatty amides. Acrylic acid/maleic acid copolymers having a molecular weight ranging from about 20,000 to about 100,000 daltons are also suitable for use herein. Such polymers are commercially available under the trade name Sokalan® CP-5 from BASF Corporation. In one aspect, the auxiliary anti-redeposition agent is selected from cellulose ethers, such as sodium carboxymethyl cellulose, methylcellulose, hydroxyalkyl cellulose, such as hydroxyethyl methylcellulose, hydroxypropyl methylcellulose, carboxymethyl methyl cellulose, and mixtures thereof. In one aspect, the auxiliary anti-redeposition agents are used in amounts ranging from about 0.1 to about 5 wt. % (based on the total weight of the composition).

Cationic Polymers

Cationic polymers are also useful as fabric softening agents. Suitable cationic polymers can be synthetically derived, or natural polymers can be synthetically modified to contain cationic moieties. Several cationic polymers their manufacturers and general descriptions of their chemical characteristics are found in the CTFA Dictionary and in the International Cosmetic Ingredient Dictionary, Vol. 1 and 2, 5th Ed., published by the Cosmetic Toiletry and Fragrance Association, Inc. (CTFA) (1993), the pertinent disclosures of which are incorporated herein by reference.

In one aspect, the cationic polymer can be selected from the group consisting of cationic or amphoteric polysaccharides, polyethyleneimine and its derivatives, a synthetic polymer made by polymerizing one or more cationic monomers selected from the group consisting of N,N-dialkylaminoalkyl acrylate, N,N-dialkylaminoalkyl methacrylate, N,N-dialkylaminoalkyl acrylamide, N,N-dialkylaminoalkylmethacrylamide, quaternized N,N dialkylaminoalkyl acrylate quaternized N,N-dialkylaminoalkyl methacrylate, quaternized N,N-dialkylaminoalkyl acrylamide, quaternized N,N-dialkylaminoalkylmethacrylamide, Methacryloamidopropyl-pentamethyl-1,3-propylene-2-ol-ammonium dichloride, N,N,N,N',N',N'',N''-heptamethyl-N''-3-(I-oxo-2-methyl-2-propenyl)aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride, methacryloyloxyethyl trimethyl ammonium methylsulfate, and combinations thereof. The cationic polymer may optionally comprise a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS® monomer) and their salts. The polymer may be a terpolymer prepared from more than two monomers. The polymer may optionally be branched or cross-linked by using branching and cross-linking monomers. Branching and crosslinking monomers include ethylene glycoldiacrylate divinylbenzene, and butadiene. In one aspect, the cationic polymer may include those produced by polymerization of ethylenically unsaturated monomers using a suitable initiator or catalyst, such as those disclosed in WO 00/56849 and U.S. Pat. No. 6,642,200. In one aspect, the cationic polymer may comprise charge neutralizing anions such that the overall polymer is neutral under ambient conditions. Suitable counter ions include (in addition to anionic species generated during use) include chloride, bromide, sulfate, methylsulfate, sulfonate, methylsulfonate, carbonate, bicarbonate, formate, acetate, citrate, nitrate, and mixtures thereof.

In one aspect, the cationic polymer can be selected from the group consisting of poly(acrylamide-co-diallyldimethylammonium chloride), poly(acrylamide-co-methacryloyloxyethyl trimethylammonium methylsulfate) poly(acrylamide-co-methacrylamidopropyltrimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxypropylacrylate-co-dimethyl aminoethyl methacrylate), poly(hydroxypropylacrylate-co-methacrylamidopropyltrimethylammonium chloride), poly(acrylamide-co-diallyldimethylammonium chloride-co-acrylic acid), poly(acrylamide-co-methacrylamidopropyltrimethyl ammonium chloride-co-acrylic acid), poly(diallyldimethyl ammonium chloride), poly(methyl acrylate-co-methacrylamidopropyltrimethyl ammonium chloride-co-acrylic acid), poly(vinylpyrrolidone-codimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole), poly(acrylamide-co-methacrylamidopropyl-pentamethyl-1,3-propylene-2-ol-ammonium dichloride), and copolymer of 1,3-dibromopropane and N,N-diethyl-N',N'-dimethyl-1,3-diaminopropane.

The foregoing cationic polymers may be further classified by their INCI (International Nomenclature of Cosmetic Ingredients) names as Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32, Polyquaternium-33, Polyquaternium-34, Polyquaternium-39, Polyquaternium-47 and Polyquaternium-53.

The cationic polymer may include natural polysaccharides that have been cationically and/or amphoterically modified. Representative cationically or amphoterically modified polysaccharides include those selected from the group consisting of cationic and amphoteric cellulose ethers; cationic or amphoteric galactomannans, such as cationic guar gum, cationic locust bean gum and cationic cassia gum; chitosan; cationic and amphoteric starch; and combinations thereof. These polymers may be further classified by their INCI names as Polyquarternium-10, Polyquaternium-24, Polyquaternium-29, Guar Hydroxypropyltrimonium Chloride, Cassia Hydroxypropyltrimonium Chloride and Starch Hydroxypropyltrimonium Chloride.

Suitable cationic polymers are commercially available under the Noverite™ tradename, product designations 300, 301, 302, 303, 304, 305, 306, 307, 308, 310, 311, 312, 313, 314 and 315, as well as Sensomer™ CI-50 and 10M polymers marketed by Lubrizol Advanced Materials, Inc., Cleveland, Ohio.

In one aspect, the fabric softening additives can be present in an amount ranging from about 0.1 to about 50 wt. %, or about 0.5 to about 20 wt. %, or from about 1 to about 10 wt. %, or from about 2 to 5 wt. % (based on the weight of the total composition).

Suds Suppressors (Anti-Foaming Agent)

The liquid detergent composition may further comprise a suds suppressor such as silicones, silica-silicone mixtures, fatty acids and their salts, and mixtures thereof. Silicones can generally be represented by the alkylated polysiloxane materials such as PDMS, while silica is normally used in finely divided forms exemplified by silica aerogels and xerogels and hydrophobic silicas of various types. An additional example of a silicone suds controlling agent is disclosed in U.S. Pat. No. 3,933,672. Other suds suppressors are the self-emulsifying silicones such as a siloxane-glycol copolymer commercially available from Dow Corning under the trade name DC-544. These materials can be incorporated directly into the liquid laundry composition or as particulates, in which the suds suppressor is releasably incorporated in a water-soluble or water-dispersible, substantially non-surface-active detergent impermeable carrier. Alternatively, the suds suppressor can be dissolved or dispersed in a liquid carrier and applied by spraying onto one or more of the other components.

In one aspect, a suitable fatty acid suds suppressor is a long chain monocarboxylic fatty acid, a long chain monocarboxylic fatty acid salt, and a mixture thereof. Long chain monocarboxylic fatty acids and salts thereof are described in U.S. Pat. No. 2,954,347. The monocarboxylic fatty acids, and salts useful herein typically have about 10 to 24 carbons, or about 12 to 18 carbon atoms and can be saturated or unsaturated and/or linear and branched. Suitable salts include the alkali metal salts such as sodium, potassium, and lithium salts, and ammonium and alkanolammonium salts. Suitable acids are selected from, but are not limited to, capric acid, undecanoic acid lauric acid, myristic acid, palmitic acid, stearic acid, isosteric acid, oleic acid, linoleic acid, ricinoleic acid, behenic acid, lignoceric acid, salts thereof, and mixtures thereof. The fatty acids can be obtained from natural or synthetic sources. The natural fatty acids can be derived from animal fat such as tallow or from vegetable oil such as coconut oil, red oil, palm kernel oil, palm oil, linseed oil, cottonseed oil, olive oil, soybean oil, peanut oil, corn oil, and mixtures thereof.

The suds suppressors are normally employed at levels of from about 0.001 to about 3 wt. %, or from about 0.01 to about 2 wt. % (based on the weight of the total composition.

Thickening Agent

In one aspect, the liquid detergent form of the disclosed technology may contain an optional thickening agent to help increase the viscosity of the softener compositions. Various categories of thickeners may be used for increasing the viscosities of fabric softening compositions containing cationic components. It is possible to employ thickeners of natural origin, for example, gelatins, starches and carrageenans, as well as cellulose-based natural thickeners known as cellulose ethers, for example, ethylhexylethylcellulose (EHEC), hydroxybutylmethylcellulose (HBMC), hydroxyethylmethylcellulose (HEMC), hydroxypropylmethylcellulose (HPMC), methyl cellulose (MC), hydroxyethylcellulose (HEC), hydroxypropylcellulose (HPC) and cetyl hydroxyethylcellulose. Thickeners bearing urethane bonds, for example, hydrophobically modified ethoxylated urethanes (HEUR) formed from the condensation of a poly (alkylene glycol), a polyisocyanate and a reagent that provides hydrophobic associativity (e.g., alkyl, aryl or arylalkyl groups) are also useful herein.

In one aspect, the thickener may be selected from crosslinked homopolymers of acrylic acid (INCI name: Carbomer), crosslinked copolymers of (meth)acrylic acid and a $C_{10}$-$C_{30}$ alkyl ester of (meth)acrylic acid (INCI name: Acrylates/$C_{10\text{-}30}$ Alkyl Acrylate Cross-polymer), an alkali-swellable emulsion (ASE) polymer or a hydrophobically modified alkali-swellable emulsion (HASE) polymer. An ASE polymer is a crosslinked emulsion copolymer prepared from (meth)acrylic acid and at least one monomer of a $C_1$-$C_5$ alkyl (meth)acrylate (INCI name: Acrylates Copolymer). A HASE polymer is a emulsion copolymer of (meth)acrylic acid, at least one $C_1$-$C_5$ alkyl (meth)acrylate and an associative monomer with a pendant poly(alkylenoxy) moiety having a hydrophobic end group, e.g., alkyl, aryl or arylalkyl groups (representative INCI name: Acrylates/Beheneth-25 Methacrylate Copolymer).

In one aspect, the thickener may be selected from a crosslinked, nonionic, amphiphilic emulsion polymer prepared from hydroxy($C_1$-$C_5$)alkyl (meth)acrylate, at least one $C_1$-$C_5$ alkyl (meth)acrylate, and an associative monomer with a pendant poly(alkylenoxy) moiety terminated with a hydrophobic end group, e.g., alkyl, aryl or arylalkyl groups (representative INCI name Acrylates/Beheneth-25 Methacrylate/HEMA Crosspolymer). Such polymers are available from Lubrizol Advanced Materials, Inc. under the trade name Carbopol™ SMART 1000, 2000 and 3000.

The thickener can be utilized in an amount ranging from about 0.25 to about 15 wt. %, or from about 0.5 to about 10 wt. %, or from about 1 to about 10 wt. %, or from about 2 to about 5 wt. % (based on the total weight of the composition).

pH Adjusting Agent

In one aspect, the detergent compositions of the present technology have a neat pH ranging from about 5 to about 13, or from about 6 to about 9, or from about 7 to about 8.5, or from about 7.5 to about 8. The pH adjusting agents useful in the present laundry compositions include alkalizing agents. Suitable alkalizing agents include, for example, ammonia solution, triethanolamine, diethanolamine, monoethanolamine, potassium hydroxide, sodium hydroxide, sodium phosphate dibasic, soluble carbonate salts, and combinations thereof. If it is necessary to reduce the pH of the laundry composition, inorganic and organic acidity agents may be included. Suitable inorganic and organic acidifying agents include, for example, HF, HCl, HBr, HI, boric acid, sulfuric acid, phosphoric acid, and/or sulphonic acid; or boric acid. The organic acidifying agent can include substituted and substituted, branched, linear and/or cyclic carboxylic acids and anhydrides thereof (e.g., citric acid, lactic acid).

Buffering Agents

Buffers which may be added to the laundry composition of the present technology include alkali or alkali earth metal carbonates, phosphates, bicarbonates, citrates, borates, acetates, silicates, acid anhydrides, succinates, as well as alkanolamines, and mixtures thereof. Exemplary buffering agents include, but are not limited to, sodium phosphate, sodium triphosphate, sodium citrate, sodium acetate, sodium bicarbonate, sodium carbonate, sodium silicate, borax, monoethanolamine, triethanolamine, and mixtures thereof.

The amount of buffering agent employed is contingent upon the desired pH to be stabilized and/or maintained which can be readily determined by the skilled formulator. In one aspect, the amount of buffer can range from 0 to about 15 wt. %, or from about 0.5 to about 10 wt. %, or from about 1 to about 5 wt. % (based on the weight of the total composition).

Perfumes and Fragrances

The detergent composition of the present technology optionally comprises one or more perfume or fragrance ingredients which are substantive to fabrics, thus minimizing the perfume lost during the laundering process. Substantive perfume ingredients are those fragrance compounds that effectively deposit on fabrics during the cleaning process and are detectable on the subsequently dried fabrics by people with normal olfactory acuity. Enduring perfumes and fragrances are those which are effectively retained and remain on the laundry for a long-lasting aesthetic benefit with a minimum amount of material, and not lost and/or wasted in the cleaning, rinsing, and/or drying steps of the laundering process. In one aspect, the perfume can be selected from alcohols, ketones, aldehydes, esters, ethers, nitriles, alkenes, and mixtures thereof. Suitable perfumes, for example, are disclosed in U.S. Pat. Nos. 8,357,649 and 8,293,697, the pertinent disclosures of which is incorporated herein by reference.

If present, the perfume or fragrance is typically incorporated in the present compositions at a level from about 0.001 to about 10 wt. % in one aspect, from about 0.01 to 5 wt. % in another aspect, and from about 0.1 to about 3 wt. % in a further aspect, based on the total weight of the composition.

Odor Control Agents

In one aspect, the detergent composition of the present technology optionally comprises an odor control agent(s) such as cyclodextrin. The term "cyclodextrin" includes any of the known cyclodextrins such as unsubstituted cyclodextrins containing from six to twelve glucose units, especially, alpha-cyclodextrin, beta-cyclodextrin, gamma-cyclodextrin and/or their derivatives and/or mixtures thereof. The alpha-cyclodextrin consists of six glucose units, the beta-cyclodextrin consists of seven glucose units, and the gamma-cyclodextrin consists of eight glucose units arranged in donut-shaped rings. The specific coupling and conformation of the glucose units give the cyclodextrins rigid, conical molecular structures with hollow interiors of specific volumes. The "lining" of each internal cavity is formed by hydrogen atoms and glycosidic bridging oxygen atoms; therefore, this surface is somewhat hydrophobic. The unique shape and physical-chemical properties of the cavity enable the cyclodextrin molecules to absorb (form inclusion complexes with) organic molecules or parts of organic molecules which can fit into the cavity. Many odorous molecules can fit into the cavity including many malodorous molecules and perfume molecules. Cyclodextrins, particularly the cationic cyclodextrins described below, can also be utilized for the delivery of perfume actives to cellulosic fabrics (U.S. Pat. No. 8,785,171).

Cyclodextrins that are useful in the present technology are highly water-soluble such as, alpha-cyclodextrin and/or derivatives thereof, gamma-cyclodextrin and/or derivatives thereof, derivatized beta-cyclodextrins, and/or mixtures thereof. The derivatives of cyclodextrin consist mainly of molecules wherein some of the OH groups are converted to OR groups. Cyclodextrin derivatives include, e.g., those with short chain alkyl groups such as methylated cyclodextrins, and ethylated cyclodextrins, e.g., wherein the substituent(s) is a methyl or an ethyl group; those with hydroxyalkyl substituted groups, e.g., wherein the substituent is a hydroxypropyl and/or hydroxyethyl group; branched cyclodextrins such as maltose-bonded cyclodextrins; cationic cyclodextrins, e.g., wherein the substituent(s) is a 2-hydroxy-3-(dimethylamino)propyl ether moiety (which is cationic at low pH); quaternary ammonium, e.g., wherein the substituent(s) is a 2-hydroxy-3-(trimethylammonio)propyl ether chloride moiety; anionic cyclodextrins such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein at least one glucopyranose unit has a 3-6-anhydro-cyclomalto structure, e.g., the mono-3-6-anhydrocyclodextrins, as disclosed in "Optimal Performances with Minimal Chemical Modification of Cyclodextrins", F. Diedaini-Pilard and B. Perly, The 7th International Cyclodextrin Symposium Abstracts, April 1994, p. 49, said references being incorporated herein by reference; and mixtures thereof. Other cyclodextrin derivatives are disclosed in U.S. Pat. Nos. 3,426,011; 3,453,257; 3,453,258; 3,453,259; 3,453,260; 3,459,731; 3,553,191; 3,565,887; 4,535,152; 4,616,008; 4,678,598; 4,638,058; 4,746,734; 5,942,217; and 6,878,695).

The level of cyclodextrin derivatives that are utilized for odor control in the detergent compositions ranges from about 0.001 to about 0.5 wt. % (based on the weight of the total composition).

Preservatives

In one aspect, the softener compositions of the disclosed technology may contain an optional preservative(s). Suitable preservatives include polymethoxy bicyclic oxazolidine, methyl paraben, ethyl paraben, propyl paraben, butyl paraben, benzyltriazole, DMDM hydantoin (also known as 1,3-dimethyl-5,5-dimethyl hydantoin), imidazolidinyl urea, phenoxyethanol, phenoxyethylparaben, methyl isothiazolinone, methyl chloro isothiazolinone, benzoisothiazolinone, triclosan, and suitable polyquaternium compounds disclosed above (e.g., Polyquaternium-1).

In one aspect, the preservatives comprise from about 0 to about 3.0 wt. %, or from about 0.01 to about 2 wt. %, or from about 0.1 to about 1 wt. %, based on the total weight of composition.

The present technology is exemplified by the following examples that are merely for the purpose of illustration and are not to be regarded as limiting the scope of the technology or the manner in which it can be practiced. Unless specifically indicated otherwise, parts and percentages are given by weight and are based on 100 percent active material.

Test Methods and Materials

Anti-Redeposition Test (Laundry Applications)

New swatches (3×4 inches) of cotton fabric (Cotton 400) or cotton/polyester blend fabric (PEDP 7435WRL) obtained from Testfabrics, Inc., West Pittston, PA were washed in a Terg-o-tometer (Testfabrics, Inc., West Pittstone, PA lab scale washing machine. The wash liquor contained suspended soils and a detergent formulated with the anti-deposition agent of the present technology. The anti-redeposition agent was tested in various surfactant chassis as set forth in the examples below. Several identically formulated commercially available anti-redeposition polymers were tested for comparative purposes. The test swatches were washed according to the following protocol:

1) Fill each vessel of the Terg-o-tometer with approximately 990 mL of deionized (DI) water.
2) Raise the water temperature to 100° F. (37.8° C.) and maintain temperature.
3) Add 6 mL of a 50,000 ppm hard water solution (~300 ppm hard water). 4) Add detergent formulated with the anti-redeposition agent and agitate for 3 minutes.
5) Add 0.1 g of carbon black (Monarch™ Specialty 120, Cabot Corporation, Billerica, MA) or 0.5 g rose clay/ 0.2 g 1:1 triolein:used motor oil mixture and mix for 15 minutes.
6) Add 4 swatches of cotton or cotton/polyester blend to each vessel. 7) Agitate for 5 minutes.
8) Remove swatches from each vessel and hand squeeze each swatch to remove excess water.
9) Remove soiled wash liquor from each vessel and refill with approximately 990 mL of DI water and 6 mL 50,000 ppm hard water solution.
10) Place swatches into the vessel and mix for 5 minutes to simulate a rinse cycle.
11) hand squeeze each swatch to remove excess water and place in 50° C. oven until dry.

After drying, each of the treated swatches were analyzed for soil deposited onto the fabric via a LabScan XE spectrophotometer, Hunter Associates Laboratory, Inc., Reston, VA, interfaced with a PC loaded with Universal Software (V4.10). The diameter of the instrument's measurement port should be chosen such that only the region of interest is included within the measurement port. Analyses are performed in a room controlled at about 23° C.±2 C° and 50%±2% relative humidity.

Calibrate the instrument per the vender instructions using the standard black and white tiles provided by the vendor as follows:

1) Open the Universal Software program and click on the "Standardize" button.
2) Choose the Area and Port:
   a. Area=1.75 inches
   b. Port=2.00 inches
3) Click on UV Filter "In".
4) Place a black calibration tile over the port and click on "O.K".
5) Place a white calibration tile over the port and click on "O.K".
6) The instrument is calibrated.

The spectrometer is used to determine the L*, a* and b* values to calculate the color deposition index (ΔE) for the treated swatches, where L* is a measurement of the whiteness index, a* is a measurement of green/red change, and b* is a measurement of bleu/yellow change. The $L^*_{BW}$, $a^*_{BW}$ and $b^*_{BW}$ values of clean, untreated swatches are measured. The carbon black stained swatches were treated for one wash cycle or five wash cycles in accordance with the protocol above and the final $L^*_{AW}$, $a^*_{AW}$ and $b^*_{AW}$ values were determined once the swatch was dried. The rose clay/triolein/used motor oil swatches were treated for five wash cycles and the final $L^*_{AW}$, $a^*_{AW}$ and $b^*_{AW}$ values were determined once the swatch was dried. In the above definitions for L*, a* and b*, the subscript "Aw" indicates "after wash", and the subscript "$_{BW}$" indicates "before wash". The L*, a* and b* values were used to calculate ΔE by the following equation:

$$\Delta E = \sqrt{[L^*_{AW} - L^*_{AW}]^2 + [a^*_{AW} - a^*_{BW}]^2 + [b^*_{AW} - b^*_{BW}]^2}$$

Lower ΔE values are indicative of less soil depositing onto the test fabric substrate.

Viscosity Measurement

Viscosities of the formulations were determined using a Brookfield DVE viscometer (Ametek Brookfield, Middleboro, MA) using a no. 3 spindle at 20 rpm. The measurements were carried out at ambient room temperature (20-25° C.).

Anti-Redeposition Test (Automatic Dish Applications)

Miele dish washing machines (Model No. G4225SCU) were used to test anti-redeposition in automatic dish washing applications. The test protocol is as follows:

1) 300 ppm hard water.
2) 100 g of IKW Ballast soil (Center for Testmaterials B.V, Vlaardingen, The Netherlands).
3) 18 g of test formulation.
4) Dishes/Silverware: 6×10-inch dinner plates and 5×7-inch saucers; 6× knives, spoons, and forks; 6× glass cups and 2× plastic cups.
5) Machines were set to "Normal Cycle" (~52° C.) with heated dry.
6) The cups were washed 5 times.
7) The spotting and filming of the cups were visually evaluated under a light box in which they were assigned a rating from 1 to 5. Lower values are indicative of better results.

| Rating[1] | Spotting | Filming |
|---|---|---|
| 1 | None | None |
| 2 | Random Spots | Barely perceivable |
| 3 | About ¼ of surface covered | Slight |
| 4 | About ½ of surface covered | Moderate |
| 5 | Virtually completely covered | Heavy |

[1]CSMA Detergents Division Test Method Compendium

Components

| | |
|---|---|
| AA | poly(acrylic acid), Acusol ™ 445N (Dow Chemical) |
| Alcohol Ethoxylate | $C_{12}$-$C_{15}$ alcohol ethoxylate (7 EO) |
| AA/MA | sodium salt of acrylic acid/maleic acid copolymer, Sokalan ™ CP-5 (BASF) |
| EA/MAA | copolymer of ethyl acrylate/methacrylic acid, Acusol ™ 845 (Dow Chemical) |
| Kathon ™ CG/ICP | methyl isothiazolinone (0.35%) and methyl chloro isothiazolinone (1.15%) (Dow Chemical) |
| LAS | linear alkyl benzene sulfonate sodium salt, 97% active (Stepan Company) |
| $Na_4EDTA$ | ethylenediaminetetraacetic acid tetrasodium salt (Millipore Sigma) |
| Noverite ™ LD920N Polymer | acrylic based builder (Lubrizol Advanced Materials, Inc.) |
| Novethix ™ HC200 Polymer | HASE polymer thicker (Lubrizol Advanced Materials, Inc.) |
| Noverite ™ K-7058D Polymer | sodium salt of low molecular weight acrylic acid builder polymer (Lubrizol Advanced Materials, Inc.) |
| PEI | Polyethylenimine, Sokalan ™ HP 20 (BASF) |
| PVP | polyvinylpyrollidone K 30 (TCI America) |
| SLES | sodium lauryl ether sulfate, Sulfochem ES-2K, (27% active) (Lubrizol Advanced Materials, Inc.) |
| SMA ™ 1000 | 1:1 styrene/maleic anhydride copolymer; Mw = 5,000 Da (Total Cray Valley) |
| SMA ™ 2000 | 2:1 styrene/maleic anhydride copolymer; Mw = 7,500 Da (Total Cray Valley) |
| STY/AA | copolymer of styrene/acrylic acid, Alcosperse ™ 747 (AkzoNobel) |
| Surfonamine ™ L100 | poly(oxyalkylene) monoamine terminated with a methyl group; EO:PO 19:3 (Huntsman Corporation) |
| Surfonamine ™ L200 | poly(oxyalkylene) monoamine terminated with a methyl group; EO:PO 41:4 (Huntsman Corporation) |
| Surfonamine ™ L207 | poly(oxyalkylene) monoamine terminated with a methyl group; EO:PO 33:10 (Huntsman Corporation) |
| TAED | tetraacetylethylenediamine |
| Tinopal ™ CBS-X | 4,4-distyryl biphenyl derivative; fluorescent whitening agent (BASF) |

Example 1 (Synthesis)

A 500 mL reactor was charged with 30 grams of SMA™ 2000 styrene/maleic anhydride copolymer and 37.5 grams of water and heated to 80° C. under a nitrogen blanket and proper agitation. Then 123.95 grams of Surfonamine™ L207 poly(oxyalkylene) monoamine was then added to the flask. By gradually increasing the temperature to 140° C., water in the reactor was removed and collected using a Dean-Stark trap. The reaction temperature was subsequently maintained at 140° C. for 16 hours. Finally, the content of the reactor was cooled to 25° C., and 230.93 grams of water was added to dilute the polymer to 40% total solids. The polymer had an acid number of 10.71.

Example 2 (Synthesis)

A 500 mL reactor was charged with 25 grams of SMA™ 1000 and 31.25 grams of water and heated to 80° C. under a nitrogen blanket and proper agitation. Then 156.48 grams of Surfonamine™ L200 poly(oxyalkylene) monoamine was added to the reactor. By gradually increasing the temperature to 140° C., water in the reactor was removed and collected using a Dean-Stark trap. The reaction temperature was subsequently maintained at 140° C. for 16 hours. Finally, the content of the reactor was cooled to 25° C., and 272.24 grams of water was added to dilute the polymer to 40% total solids. The polymer had an acid number of 7.21.

Example 3 (Synthesis)

A 500 mL reactor was charged with 50 grams of SMA™ 2000 and 62.5 grams of water and heated to 80° C. under a nitrogen blanket and proper agitation. Then 103.29 grams of Surfonamine™ L100 poly(oxyalkylene) monoamine was added to the flask. By gradually increasing the temperature to 140° C., water in the reactor is removed and collected using a Dean-Stark trap. The reaction temperature was subsequently maintained at 140° C. for 16 hours. Finally, the content of the reactor was cooled to 25° C. and 229.94 grams of water was added to dilute the polymer to 40% total solids. The polymer had an acid number of 14.13.

Example 4 (Formulation)

A liquid laundry detergent (anionic chassis) composition containing the anti-redeposition agent prepared in Example 3 was formulated from the ingredients set forth in Table 1. Commercially, available anti-redeposition polymers were identically formulated and all formulations were evaluated for anti-redeposition properties in accordance with the Laundry Anti-Redeposition Test (cotton swatch) protocol outlined above.

TABLE 1

| Ingredient (wt. %) | AA | EA/MAA | STY/AA | AA/MA | PEI | EX. 3 |
|---|---|---|---|---|---|---|
| DI Water | q.s. 100 | q.s. 100 | q.s. 100 | q.s. 100 | q.s. 100 | q.s. 100 |
| LAS | 12.5 | 12.5 | 12.5 | 12.5 | 12.5 | 12.5 |
| Polymer | 1 | 1 | 1 | 1 | 1 | 1 |
| NaOH (50% active) | | | Adjust to pH 7 to 9 | | | |
| ΔE Carbon Black | 23.72 | 8.65 | 17.44 | 24.64 | 11.22 | 15.57 |

After 1 cycle of exposure to wash liquor dosed with carbon black soil, the polymer of Example 3 exhibits comparable performance to a STY/AA copolymer and PEI, and significantly better performance to AA homopolymers or AA/MA copolymers and worse performance to EA/MAA copolymers.

Example 5 (Formulation)

A liquid laundry detergent (nonionic chassis) composition containing the anti-redeposition agent prepared in Example 3 was formulated from the ingredients set forth in Table 2. Commercially, available anti-redeposition polymers were identically formulated and all formulations were evaluated for anti-redeposition properties in accordance with the Laundry Anti-Redeposition Test (cotton swatch) protocol outlined above.

TABLE 2

| Ingredient (wt. %) | AA | EA/MAA | STY/AA | AA/MA | PEI | EX. 3 |
|---|---|---|---|---|---|---|
| DI Water | q.s. 100 | q.s. 100 | q.s. 100 | q.s. 100 | q.s. 100 | q.s. 100 |
| Alcohol Ethoxylate | 12.5 | 12.5 | 12.5 | 12.5 | 12.5 | 12.5 |
| Polymer | 1 | 1 | 1 | 1 | 1 | 1 |

TABLE 2-continued

| Ingredient (wt. %) | AA | EA/MAA | STY/AA | AA/MA | PEI | EX. 3 |
|---|---|---|---|---|---|---|
| NaOH (50% active) | | | Adjust to pH 7 to 9 | | | |
| ΔE Carbon Black | 3.63 | 3.58 | 4.74 | 6.28 | 6.93 | 3.95 |

After 1 cycle of exposure to wash liquor dosed with carbon black soil, the polymer of Example 3 exhibits comparable performance to AA homopolymer, EA/MAA copolymer and STY/AA copolymer, and better performance than AA/MA copolymer and PEI.

Example 6 (Formulation)

A liquid laundry detergent (ethoxylated anionic chassis) composition containing the anti-redeposition agent prepared in Example 3 was formulated from the ingredients set forth in Table 3. Commercially, available anti-redeposition polymers were identically formulated and all formulations were evaluated for anti-redeposition properties in accordance with the Laundry Anti-Redeposition Test (cotton swatch) protocol outlined above.

TABLE 3

| Ingredient (wt. %) | AA | EA/MAA | STY/AA | AA/MA | PEI | EX. 3 |
|---|---|---|---|---|---|---|
| DI Water | q.s. 100 | q.s. 100 | q.s. 100 | q.s. 100 | q.s. 100 | q.s. 100 |
| SLES | 12.5 | 12.5 | 12.5 | 12.5 | 12.5 | 12.5 |
| Polymer | 1 | 1 | 1 | 1 | 1 | 1 |
| NaOH (50% active) | | | Adjust to pH 7 to 9 | | | |
| ΔE Carbon Black | 5.51 | 8.76 | 5.58 | 6.12 | 5.20 | 4.08 |

After 1 cycle of exposure to wash liquor dosed with carbon black soil, the polymer of Example 3 exhibits better performance than the commercial anti-redeposition agents.

Example 7 (Formulation)

This example demonstrates the efficacy of the polymer of Example 3 in an economy detergent formulation (anionic/nonionic chassis) that has low surfactant loadings. The polymer to surfactant active weight ratio is 0.5:8. The ingredients were added in the order as shown in Table 4 with enough time between each ingredient addition to allow for proper dispersion of the material. The Brookfield viscosities of the formulations with and without added polymer were 230 and 80 mPa·s, respectively. As shown in the Table below, after 1 cycle of exposure to wash liquor dosed with carbon black stain and 5 cycles of exposure to wash liquor dosed with rose clay/triolein/used motor oil soils, the formulation containing the polymer of Example 3 shows better performance on cotton than the identical detergent formulated without the polymer.

TABLE 4

| Ingredient (wt. %) | Control | Ex. 3 |
|---|---|---|
| DI Water | q.s. 100 | q.s. 100 |
| LAS | 4 | 4 |
| Coconut Fatty Acid | 1 | 1 |
| Alcohol Ethoxylate | 4 | 4 |
| Xylene Sulfate | 0.5 | 0.5 |
| Citric Acid | 1 | 1 |
| Sodium Silicate | 2 | 2 |
| Polymer | — | 0.5 |
| NaOH (50% active) | Adjust pH 11.5-13 | Adjust pH 11.5-13 |
| ΔE Carbon Black | 11.99 | 10.57 |
| ΔE Rose Clay/Triolein/Used Motor Oil | 2.15 | 1.11 |

Example 8 (Formulation)

This example demonstrates the efficacy of the polymer of Example 3 in liquid laundry formulations containing enzymes, fatty acids, formate, and borates. The polymer to surfactant active weight ratio is 1:12.5. The ingredients were added in the order as shown in Table 5 with enough time between each ingredient addition to allow for proper dispersion of the material. The Brookfield viscosities of the formulations are within that of a typical laundry formulation (50-1000 mPa·s). As shown in the Table below, after 1 cycle of exposure to wash liquor dosed with carbon black soil and 5 cycles of exposure to wash liquor dosed with rose clay/triolein/used motor oil soils, the formulation containing the polymer of Example 3 shows better performance on cotton than the identical detergent formulated without the polymer.

TABLE 5

| Ingredient | No Polymer | Ex. No. 3 |
|---|---|---|
| DI Water | q.s. 100 | q.s. 100 |
| SLES | 7 | 7 |
| Na₄EDTA | 0.1 | 0.1 |
| Sodium Borate | 1 | 1 |
| Polymer | — | 1 |
| Sodium Formate | 0.5 | 0.5 |
| Sodium Chloride | 0.7 | 0.7 |
| Kathon CG ICP | 1.5 | 1.5 |
| LAS | 2 | 2 |
| Glycerin | 2 | 2 |
| Citric Acid | 0.3 | 0.3 |
| Alcohol Ethoxylate | 3.5 | 3.5 |
| Coconut Fatty Acid | 0.4 | 0.4 |
| Sodium Carbonate | 0.2 | 0.2 |
| Sodium Chloride | 0.04 | 0.04 |
| NaOH (50% active) | Adjust pH 7 to 9 | Adjust pH 7 to 9 |
| Protease | 0.397 | 0.397 |
| Amylase | 0.25 | 0.25 |
| ΔE Carbon Black | 12.64 | 10.96 |
| ΔE Rose Clay/Triolein/Used Motor Oil | 5.91 | 2.54 |

Example 9

This Example demonstrates the efficacy of the polymer of Example 3 in high concentration nonionic surfactant formulations with low water content that can be used in a unit dose application. The polymer to surfactant active weight ratio is 4:67. The ingredients were added in the order as shown in Table 6 with enough time between each ingredient addition to allow for proper dispersion of the material. As shown in the Table below, after 1 cycle of exposure to wash liquor dosed with carbon black soil and 5 cycles of exposure to wash liquor dosed with rose clay/triolein/used motor oil soils, the formulation containing the polymer of Example 3 shows better performance on cotton than the identical detergent formulated without the polymer.

TABLE 6

| Ingredient | No Polymer | Ex. No. 3 |
|---|---|---|
| DI Water | q.s. 100 | q.s. 100 |
| Propylene Glycol | 14.4 | 14.4 |
| Glycerin | 4.4 | 4.4 |
| Alcohol Ethoxylate (C12-15, 3EO) | 12 | 12 |
| Water | 5 | 5 |
| SLES | 8 | 8 |
| Linear Alkyl Benzene Sulfonic Acid | 10 | 10 |
| Coconut Fatty Acid | 1.25 | 1.25 |
| Polymer | — | 4 |
| Monoethanolamine | Adjust pH 7 to 9 | |
| Protease | 1.28 | 1.28 |
| Amylase | 0.32 | 0.32 |
| ΔE Carbon Black | 11.16 | 8.66 |
| ΔE Rose Clay/Triolein/Used Motor Oil | 1.08 | 0.88 |

Example 10

This Example illustrates the efficacy of the polymer of Example 3 in an economy formulation that has low surfactant loadings. Identical formulations containing typical anti-redeposition polymers were tested for comparison. The polymer to surfactant active weight ratio is 0.25:10. The ingredients were added in the order as shown in Table 7 with enough time between each ingredient addition to allow for proper dispersion of the material. The Brookfield viscosities of the formulations ranged from 400 to 700 mPa·s. As shown in the Table 7, after 5 cycles of exposure to wash liquor dosed with carbon black soil and 5 cycles of exposure to wash liquor dosed with rose clay/triolein/used motor oil soils, the formulation containing the polymer of Example 3 shows better performance than the commercial anti-redeposition polymers for cotton swatches and comparable performance for cotton/polyester blend swatches.

TABLE 7

| Ingredient | Fabric | AA | AA/MA | PEI | Ex. No. 3 |
|---|---|---|---|---|---|
| DI Water | | q.s. 100 | q.s. 100 | q.s. 100 | q.s. 100 |
| SLES | | 3.79 | 3.79 | 3.79 | 9 |
| Na₄EDTA | | 0.1 | 0.1 | 0.1 | 1 |
| LAS | | 4.09 | 4.09 | 4.09 | 9 |
| Coconut Fatty Acid | | 0.25 | 0.25 | 0.25 | 0.5 |
| Alcohol Ethoxylate | | 2.12 | 2.12 | 2.12 | 1 |
| Sodium Carbonate | | 1 | 1 | 1 | 2 |
| Polymer | | 0.25 | 0.25 | 0.25 | 0.5 |
| NaOH (50% active) | | Adjust pH 11.5 to 13 | | | |
| Sodium Chloride | | 2 | 2 | 2 | 2 |
| ΔE Carbon Black | Cotton | 15.76 | 14.49 | 14.8 | 11.75 |
| ΔE Rose Clay/Triolein/Used Motor Oil | | 2.73 | 2.17 | 2.11 | 1.51 |
| ΔE Carbon Black | | 8.06 | 8.87 | 10.02 | 7.05 |
| ΔE Rose Clay/Triolein/Used Motor Oil | Cotton/Polyester Blend | 1.44 | 1.04 | 0.97 | 0.85 |

Example 11

This example illustrates the efficacy of the polymer of Example 3 with liquid laundry formulations containing enzymes, fatty acids, and a high level of surfactant. The polymer to surfactant active weight ratio is 0.5:15.88. The ingredients were added in the order as shown in Table 8 with enough time between each ingredient addition to allow for proper dispersion of the material. The Brookfield viscosities of the formulations are within a typical laundry formulation (700-2000 mPa·s). As shown in the Table below, after 5 cycles of exposure to wash liquor dosed with carbon black soil and 5 cycles of exposure to wash liquor dosed with rose clay/triolein/used motor oil soils, the formulation containing the polymer of Example 3 shows comparable performance to the commercial anti-redeposition polymers for cotton swatches and cotton/polyester blend swatches.

TABLE 8

| Ingredient | Fabric | AA | AA/MA | PEI | Ex. No. 3 |
|---|---|---|---|---|---|
| DI Water | | q.s. 100 | q.s. 100 | q.s. 100 | q.s. 100 |
| PVP | | 0.75 | 0.75 | 0.75 | 0.75 |
| SLES | | 5 | 5 | 5 | 5 |
| Tinopal ™ CBS-X | | 0.1 | 0.1 | 0.1 | 0.1 |
| Noverite ™ LD920N | | 0.5 | 0.5 | 0.5 | 0.5 |
| LAS | | 5.88 | 5.88 | 5.88 | 5.88 |
| Coconut Fatty Acid | | 0.5 | 0.5 | 0.5 | 0.5 |
| Alcohol Ethoxylate | | 5 | 5 | 5 | 5 |
| Glycerin | | 2 | 2 | 2 | 2 |
| Polymer | | 0.5 | 0.5 | 0.5 | 0.5 |
| Novethix ™ HC200 | | 1 | 1 | 1 | 1 |
| Triethanolamine | | 0.4 | 0.4 | 0.4 | 0.4 |
| Protease | | 0.5 | 0.5 | 0.5 | 0.5 |
| Amylase | | 0.25 | 0.25 | 0.25 | 0.25 |
| NaOH (50% active) | | Adjust pH 7 to 9 | | | |
| ΔE Carbon Black | Cotton | 28.41 | 27.85 | 27.43 | 26.63 |
| ΔE Rose Clay/Triolein/Used Motor Oil | | 6.75 | 4.44 | 9.04 | 6.54 |
| ΔE Carbon Black | Cotton/Polyester Blend | 22.15 | 22.36 | 23.72 | 23.10 |
| ΔE Rose Clay/Triolein/Used Motor Oil | | 1.87 | 2.17 | 1.96 | 1.99 |

Example 12

This example illustrates the efficacy of the polymer of Example 3 in a typical powder formulation with LAS as the surfactant. The polymer to surfactant active weight ratio is 0.7:19.73. The ingredients were added in the order as shown in Table 9 with enough time between each ingredient addition to allow for proper dispersion of the material. The polymer of Example 3 performed significantly better than comparative polymers for the carbon black soil after 5 cycles and performed slightly better for rose clay/triolein/used motor oil after 5 cycles.

TABLE 9

| Ingredient | AA | AA/MA | Ex. No. 3 |
|---|---|---|---|
| NaOH | 2.82 | 2.82 | 2.82 |
| LAS | 19.73 | 19.73 | 19.73 |
| Noverite LD920N | 0.73 | 0.73 | 0.73 |
| Polymer | 0.7 | 0.7 | 0.7 |
| Sodium Silicate | 18.33 | 18.33 | 18.33 |
| Sodium Carbonate | 12.4 | 12.4 | 12.4 |
| Sodium Sulfate | 45.28 | 45.28 | 45.28 |

TABLE 9-continued

| Ingredient | AA | AA/MA | Ex. No. 3 |
|---|---|---|---|
| ΔE Carbon Black | 13.95 | 12.92 | 10.51 |
| ΔE Rose Clay/Triolein/Used Motor Oil | 3.90 | 3.87 | 1.49 |

Example 13

The following example illustrates the efficacy of the polymer of Example 3 in a generic automatic dish formulation. The ingredients were added in the order as shown in Table 10 with enough time between each ingredient addition to allow for proper dispersion of the material. When compared to a commercial polymer, the polymer shows equal performance on glass and plastic for spotting and slightly better performance on glass and plastic filming.

TABLE 10

| Ingredient | Cup Type | AA/MA | Ex. No. 3 |
|---|---|---|---|
| Sodium Sulfate | | q.s. to 100 | q.s. to 100 |
| Sodium Citrate | | 22.22 | 22.22 |
| Noverite ™ K-7058D Polymer | | 1.11 | 1.11 |
| Sodium Carbonate | | 0.33 | 0.33 |
| | | 16.67 | 16.67 |
| Alcohol Ethoxylate | | 3.33 | 3.33 |
| Sodium Percarbonate | | 13.33 | 13.33 |
| TAED | | 2.22 | 2.22 |
| Sodium Disilicate | | 3.33 | 3.33 |
| Protease | | 0.56 | 0.56 |
| Amylase | | 0.56 | 0.56 |
| Test Ratings | | | |
| Spotting | Glass | 2.42 | 2.5 |
| Filming | | 2 | 1.58 |
| Spotting | Plastic | 3 | 3 |
| Filming | | 4.5 | 3.25 |

What is claimed is:

1. A method for imparting anti-redeposition properties to a laundry detergent composition by adding from about 0.25 to about 2 wt. % (based on the total weight of the composition) of a functionalized polymer to said detergent, wherein said laundry detergent composition comprises at least one surfactant, and wherein said functionalized polymer is prepared by reacting:
   i) a styrene maleic anhydride copolymer;
   ii) a poly(oxyalkylene) monoamine; and optionally
   iii) a poly(oxyalkylene) diol;
   wherein said styrene maleic anhydride copolymer (i) has a styrene: maleic anhydride mole ratio of 2:1.

2. The method of claim 1, wherein said styrene maleic anhydride copolymer has a molecular weight ranging from about 3000 to about 30,000 $M_w$.

3. The method of claim 1, wherein said poly(oxyalkylene) monoamine (ii) is represented by the structure:

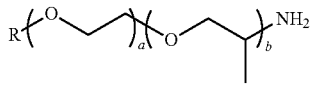

wherein R represents hydrogen or $C_1$ to $C_{10}$ alkyl; "a" represents a number from 0 to 75; and "b" represents a number from 0 to 50, subject to the proviso that "a" and "b" cannot be 0 at the same time.

4. The method of claim 3, wherein R is hydrogen, methyl, ethyl, n-propyl, isopropyl, n-butyl, isobutyl, pentyl, neopentyl, and ethylhexyl.

5. The method of claim 1, wherein a portion of said anhydride groups of said styrene maleic anhydride copolymer (i) react with the amine nitrogen of said poly(oxyalkylene) monoamine (ii)) to form pendant poly(oxyalkylene) imine groups and/or pendant poly(oxyalkylene) amide groups.

6. The method of claim 1, wherein a portion of the anhydride groups of said styrene maleic anhydride copolymer (i) react with the amine nitrogen of said poly(oxyalkylene) monoamine (ii) to form a pendant imine represented by the structure:

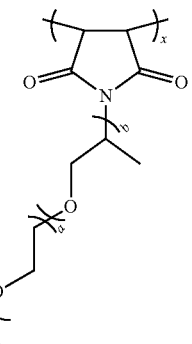

wherein R represents hydrogen or $C_1$ to $C_{10}$ alkyl; "a" represents a number from 0 to 75, "b" represents a number from 0 to 50, "x" ranges from 15 to 60, subject to the proviso that "a" and "b" cannot be 0 at the same time.

7. The method of claim 1, wherein a portion of the anhydride groups of said styrene maleic anhydride copolymer (i) react with the amine nitrogen of said poly(oxyalkylene) monoamine (ii) to form a pendant amide represented by the structure:

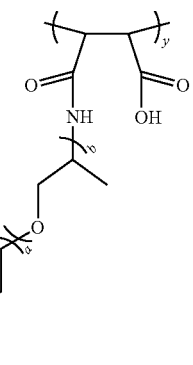

wherein R represents hydrogen or $C_1$ to $C_{10}$ alkyl; "a" represents a number from 0 to 75, "b" represents a number from 0 to 50, "y" ranges from 2 to 30, subject to the proviso that "a" and "b" cannot be 0 at the same time.

8. The method of claim 1, wherein said functionalized polymer has an acid value ranging from about 0 to about 80 mg KOH/g.

* * * * *